US007246009B2

(12) United States Patent
Hamblen et al.

(10) Patent No.: US 7,246,009 B2
(45) Date of Patent: Jul. 17, 2007

(54) RESOURCE MANAGEMENT SYSTEM, FOR EXAMPLE, TRACKING AND MANAGEMENT SYSTEM FOR TRUCKS

(75) Inventors: G. Allen Hamblen, Seattle, WA (US); David Mark Leatham, Seattle, WA (US); Daniel Bruce Smith, Seattle, WA (US); Ke Xue, Seattle, WA (US)

(73) Assignee: Glacier Northwest, Inc., Seattle, WA (US)

( * ) Notice: Subject to any disclaimer, the term of this patent is extended or adjusted under 35 U.S.C. 154(b) by 0 days.

(21) Appl. No.: 10/770,842

(22) Filed: Feb. 2, 2004

(65) Prior Publication Data

US 2005/0171692 A1 Aug. 4, 2005

(51) Int. Cl.
*G01C 21/30* (2006.01)
*G08G 1/123* (2006.01)

(52) U.S. Cl. ...................... 701/209; 701/201; 701/213; 340/988; 342/357.06; 342/357.12

(58) Field of Classification Search ................. 701/29, 701/36, 200–202, 204, 211, 207, 213–214; 340/988; 342/357.06, 357.09, 357.1, 357.12; 705/32

See application file for complete search history.

(56) References Cited

U.S. PATENT DOCUMENTS

| | | | | |
|---|---|---|---|---|
| 5,122,959 | A * | 6/1992 | Nathanson et al. | 701/117 |
| 6,212,393 | B1 * | 4/2001 | Suarez et al. | 455/456.4 |
| 6,331,825 | B1 | 12/2001 | Ladner et al. | 340/988 |
| 6,496,775 | B2 * | 12/2002 | McDonald et al. | 701/213 |
| 6,519,571 | B1 * | 2/2003 | Guheen et al. | 705/14 |
| 6,611,755 | B1 | 8/2003 | Coffee et al. | 701/213 |
| 6,816,784 | B1 * | 11/2004 | Khan et al. | 701/213 |
| 6,853,391 | B2 * | 2/2005 | Bates et al. | 715/854 |

FOREIGN PATENT DOCUMENTS

EP 0 125 839 11/1984

* cited by examiner

*Primary Examiner*—Y. Beaulieu
(74) *Attorney, Agent, or Firm*—Seed IP Law Group PLLC

(57) ABSTRACT

A resource management system is provided for tracking the location and status of, and managing, trucks going to and from batch plants and jobsites. Vehicle-mounted sensors communicate delivery status information via a wireless network. Status and performance data can be reviewed in real time to allow a dispatcher to efficiently manage the truck fleet. Electronic tickets and exception reports are provided.

27 Claims, 38 Drawing Sheets

TruckTRAX - AVG LOAD SIZE (BY DRIVER)

Plant: ALL

Start Date: 5/11/2003
End Date: 5/12/2003

| DATE | PLANT | DRIVER | YARDS | TRIPS | YRDS/TRIP |
|---|---|---|---|---|---|
| 05/11/03 | Dupont XXXXXX | Bender, Hank | 19.0 | 2 | 9.50 |
| | | Brackmeier, Gary | 9.0 | 1 | 9.00 |
| | | DeFazio, Dave | 14.5 | 2 | 7.25 |
| | | Gillotti, Joe | 9.5 | 1 | 9.50 |
| | | Brown, Steve | 6.3 | 2 | 3.13 |
| | | Richard, Ron | 7.5 | 2 | 3.75 |
| | | Ries, Gary | 18.5 | 2 | 9.25 |
| | | SUB-TOTAL | 84.3 | 12 | 7.02 |
| | Duwamish Plant #1 | Antonsen, Chuck | 15.0 | 2 | 7.50 |
| | | Bissell, Bill | 9.0 | 1 | 9.00 |
| | | Bonthius, Rick | 18.5 | 3 | 6.17 |
| | | Clapper, Bryan | 19.0 | 4 | 4.75 |
| | | Eggebraten, Walt | 17.5 | 3 | 5.83 |
| | | Fleming, Bill | 11.3 | 2 | 5.63 |
| | | Hembree, Wayne | 28.0 | 3 | 9.33 |
| | | Hislop, Claude | 29.0 | 3 | 9.67 |
| | | Marinacci, Pat | 31.0 | 5 | 6.20 |
| | | Mattson, Gary | 36.5 | 4 | 9.13 |
| | | Matwichuk, Corwin | 21.5 | 3 | 7.17 |
| | | McQuade, Jeff | 8.0 | 1 | 8.00 |
| | | Meyer, David | 31.5 | 4 | 7.88 |
| | | Mitchell, Willie | 11.5 | 2 | 5.75 |
| | | Morey, Tim | 27.0 | 3 | 9.00 |
| | | Moss, Clark | 11.0 | 2 | 5.50 |
| | | Jones, Robert | 26.5 | 5 | 2.65 |
| | | Pekarek, Mary | 17.5 | 3 | 5.83 |
| | | Rinehart, Mike | 18.5 | 4 | 4.63 |
| | | Roe, Mick | 19.0 | 3 | 6.33 |
| | | Schantz, Bill | 38.5 | 4 | 9.63 |
| | | Stevenson, John | 41.5 | 5 | 8.30 |
| | | Sullivan, Andy | 14.5 | 2 | 7.25 |
| | | Thomas, Steve | 30.5 | 4 | 7.63 |
| | | Valenta, Dean | 10.0 | 2 | 5.00 |
| | | Wilson, Robin | 27.5 | 3 | 9.17 |
| | | Yormark, Mark | 26.0 | 4 | 6.50 |
| | | SUB-TOTAL | 595.3 | 89 | 6.69 |

*FIG. 36A*

| Customer | time spent in each status (minutes) | | | | | |
|---|---|---|---|---|---|---|
| | To Job | On Job | To Plant | Total Travel | Total Trip | Trips |
| ABBOTT CUSTOM HOMES/BOTHELL!!!! | 36.0 | 9.0 | 27.0 | 63.0 | 72.0 | 1.0 |
| ALBRECHT BIRKENBUEL INC | 27.0 | 52.0 | 27.0 | 54.0 | 106.0 | 1.0 |
| ALLIED CONSTRUCTION ASSOCIATES | 6.0 | 26.4 | 6.6 | 12.6 | 39.0 | 6.0 |
| ANDERSON RICHARDSON HARTLEY | 16.0 | 65.0 | 34.0 | 50.0 | 115.0 | 1.0 |
| ARCON BUILDERS, LLC | 17.0 | 43.0 | 15.0 | 32.0 | 75.0 | 2.0 |
| ASTROF, THOMAS CONST ***OF EVERETT!!!!*** | 17.0 | 130.0 | 25.0 | 42.0 | 172.0 | 1.0 |
| BARTON LASER LEVELING, INC. | 9.0 | 30.0 | 17.0 | 26.0 | 56.0 | 1.0 |
| BRAY BROS USA LLC | 12.0 | 64.0 | 14.0 | 26.0 | 90.0 | 1.0 |
| C A T CONSTRUCTION | 7.3 | 73.5 | 9.5 | 16.8 | 90.3 | 3.0 |
| CALIBER CONCRETE CONST INC | 8.0 | 110.0 | 8.0 | 16.0 | 126.0 | 1.0 |
| CASH SALES SEATTLE | 15.0 | 76.0 | 11.0 | 26.0 | 102.0 | 1.0 |
| CENTRAL CASCADE CONCRETE, INC | 21.5 | 42.0 | 14.5 | 36.0 | 78.0 | 2.0 |
| COD / CRAIG A LAFERRERA | 23.5 | 69.0 | 21.5 | 45.0 | 114.0 | 2.0 |
| COD / GREATER FRONTIER | 16.0 | 72.0 | 5.0 | 21.0 | 93.0 | 1.0 |
| COD COMPLETE CONTRACTING | 20.0 | 110.0 | 12.0 | 32.0 | 142.0 | 1.0 |
| COD/ J LARIS | 12.0 | 159.0 | 8.0 | 20.0 | 179.0 | 1.0 |
| COD/ PRO KRETE | 40.0 | 129.0 | 35.0 | 75.0 | 204.0 | 1.0 |
| COD/CAVANAUGH | 23.0 | 114.0 | 20.0 | 43.0 | 157.0 | 1.0 |
| COD/S & S | 42.0 | 60.0 | 40.0 | 82.0 | 142.0 | 1.0 |
| COD/SIU | 18.0 | 41.5 | 17.0 | 35.0 | 76.5 | 2.0 |
| CONCRETE CONSTRUCTION NW INC | 28.0 | 80.0 | 27.0 | 55.0 | 135.0 | 1.0 |
| CREATIVE DESIGN BUILDING INC | 25.0 | 37.0 | 32.0 | 57.0 | 94.0 | 1.0 |
| DEACON, S.D. CORP | 16.0 | 58.0 | 12.5 | 28.5 | 86.5 | 1.0 |
| FERGUSON CONSTRUCTION | 14.4 | 34.8 | 6.2 | 20.6 | 55.4 | 8.0 |
| FINISHING EDGE/MUST GET JOB# | 20.8 | 166.7 | 46.7 | 67.4 | 234.1 | 4.0 |
| FOUNDATION SPECIALISTS | 24.0 | 88.7 | 29.3 | 53.3 | 142.0 | 3.0 |
| FOUSHEE & ASSOCIATES CO INC | 29.2 | 36.0 | 33.5 | 62.7 | 98.7 | 17.0 |
| GLY CONST | 24.5 | 45.0 | 25.0 | 49.5 | 94.5 | 2.0 |
| HAWKINS CONSTRUCTION | 22.0 | 67.0 | 30.0 | 52.0 | 119.0 | 1.0 |
| ICON MATERIALS INC | 10.0 | 38.0 | 15.0 | 25.0 | 63.0 | 1.0 |
| JONES D H CONSTRUCTION | 21.0 | 148.0 | 20.0 | 41.0 | 189.0 | 1.0 |

*FIG. 36B*

| | | | | | | | | |
|---|---|---|---|---|---|---|---|---|
| 9 | Sum of Hours | | | Date | | | | |
| 10 | Hot Spot | Truck | Truck Status | 12/18/2003 | 12/19/2003 | 12/20/2003 | 12/22/2003 | Grand Total |
| 11 | CCCall | 364 | IN PLANT | | | 0.62 | | 0.62 |
| 12 | | 364 Total | | | | 0.62 | | 0.62 |
| 13 | | 399 | IN PLANT | | | 0.98 | 2.43 | 3.41 |
| 14 | | 399 Total | | | | 0.98 | 2.43 | 3.41 |
| 15 | | 425 | IN PLANT | | | 0.33 | 0.3 | 0.63 |
| 16 | | 425 Total | | | | 0.33 | 0.3 | 0.63 |
| 17 | | 432 | IN PLANT | | 0.13 | 0.7 | 0.45 | 1.28 |
| 18 | | 432 Total | | | 0.13 | 0.7 | 0.45 | 1.28 |
| 19 | | 448 | IN PLANT | | 0.05 | | 2.32 | 2.37 |
| 20 | | 448 Total | | | 0.05 | | 2.32 | 2.37 |
| 21 | | 470 | IN PLANT | | 0.07 | 1.1 | 1.72 | 2.89 |
| 22 | | 470 Total | | | 0.07 | 1.1 | 1.72 | 2.89 |
| 23 | | 488 | IN PLANT | | | 1.03 | 0.68 | 1.71 |
| 24 | | 488 Total | | | | 1.03 | 0.68 | 1.71 |
| 25 | | 493 | IN PLANT | | | 0.58 | 1.55 | 2.13 |
| 26 | | 493 Total | | | | 0.58 | 1.55 | 2.13 |
| 27 | CCCall Total | | | | 0.25 | 5.34 | 9.45 | 15.04 |
| 28 | CCReclaim | 364 | IN PLANT | 0.47 | 0.03 | 0.23 | | 0.73 |
| 29 | | 364 Total | | 0.47 | 0.03 | 0.23 | | 0.73 |
| 30 | | 399 | IN PLANT | 0.12 | | 0.12 | | 0.24 |
| 31 | | 399 Total | | 0.12 | | 0.12 | | 0.24 |
| 32 | | 425 | IN PLANT | 0.47 | 0.3 | 0.48 | | 1.25 |
| 33 | | 425 Total | | 0.47 | 0.3 | 0.48 | | 1.25 |
| 34 | | 432 | IN PLANT | 0.88 | 0.77 | 0.75 | 0.02 | 2.42 |
| 35 | | 432 Total | | 0.88 | 0.77 | 0.75 | 0.02 | 2.42 |
| 36 | | 448 | IN PLANT | 0.4 | | | 0.02 | 0.42 |
| 37 | | 448 Total | | 0.4 | | | 0.02 | 0.42 |
| 38 | | 470 | IN PLANT | | 0.02 | 0.2 | | 0.22 |
| 39 | | 470 Total | | | 0.02 | 0.2 | | 0.22 |
| 40 | | 488 | IN PLANT | 0.42 | 0.62 | 0.48 | | 1.52 |
| 41 | | 488 Total | | 0.42 | 0.62 | 0.48 | | 1.52 |
| 42 | | 493 | IN PLANT | | 0.22 | 0.53 | | 0.75 |
| 43 | | 493 Total | | | 0.22 | 0.53 | | 0.75 |
| 44 | CCReclaim Total | | | 2.76 | 1.96 | 2.79 | 0.04 | 7.55 |
| 45 | **Grand Total** | | | 2.76 | 2.21 | 8.13 | 9.49 | 22.59 |

*FIG. 36C*

RESOURCE MANAGEMENT SYSTEM, FOR EXAMPLE, TRACKING AND MANAGEMENT SYSTEM FOR TRUCKS

BACKGROUND OF THE INVENTION

1. Field of the Invention

The invention relates to a resource management system, and more particularly, to a method and system for integrating order management and mapping with real-time tracking and status of concrete ready mix trucks.

2. Description of the Related Art

Ready mix concrete delivery has been historically difficult to efficiently manage. Traditionally, dispatch orders have been transmitted via telephone and radio to the ready mix truck drivers. This method yielded significant human error and did not enable the dispatcher to: monitor unbudgeted overtime; track breakdowns; account for lost tickets; correct errors in transcribing orders; know exact location and status of the truck, and the like.

Operators and dispatchers of fleet vehicle businesses such as ready mix concrete delivery need to know where each vehicle in the fleet is located, need an accurate accounting of the vehicle's activities, and need to be able to make adjustments during the course of the operation in order to efficiently utilize the resources. Historically, radio communication and telephone communication dominated the ready mix delivery environment. More recently, vehicle-locating systems incorporating Global Positioning System (GPS) receivers have been used for tracking fleet vehicles. These systems provided effective tracking systems, but did not enable the operator or dispatcher to manage the fleet. U.S. Pat. Nos. 6,496,775 and 6,611,755 illustrate systems that had attempted to provide tracking systems to both monitor and manage the vehicles, but both systems include data transmission limitations that do not allow real-time management and tracking on-board the vehicle without additional communication with a base server.

BRIEF SUMMARY OF THE INVENTION

A resource management system for tracking the real-time location and status of a plurality of trucks during interaction with a plurality of batch plants and a plurality of jobsites to provide a system for managing the trucks and drivers; providing customer efficiency; and providing dispatch accountability. Vehicle-mounted computer system automatically communicates delivery status information via a wireless network, without requiring driver intervention. The on-board personal computer (PC) or Personal Digital Assistant (PDA) displays GPS maps, relays driver messages and stores performance data. The status and performance data can be reviewed in real time to allow the dispatcher to efficiently manage the truck fleet with regard to the jobsite demands and/or the capabilities of the available batch plants. Alternatively, the status and performance data can be reviewed at a later time to analyze and improve resource allocation. The on-board processing unit allows complete transactions to occur without additional communication with the server once the truck has left the plant.

Additional advantages of the present system include the ability to redirect loaded trucks to a different job without having to return to the plant for a new ticket; customizable status calculation script; adjustable data collection frequency up to once per second; allows for providing finishing subcontractor with a billing service; online quote/order system based on demand; real-time exception management system; allows display of orders by time, size, and price. In addition, the system is automated and digital, providing electronic ticketing, and eliminating driver-generated forms, minimizing entry errors and lowering the data entry costs associated with producing manual load tickets.

BRIEF DESCRIPTION OF THE SEVERAL VIEWS OF THE DRAWING(S)

FIGS. 36A–C are reports generated from the data recorded in accordance with principles of the present invention.

Figure 37:
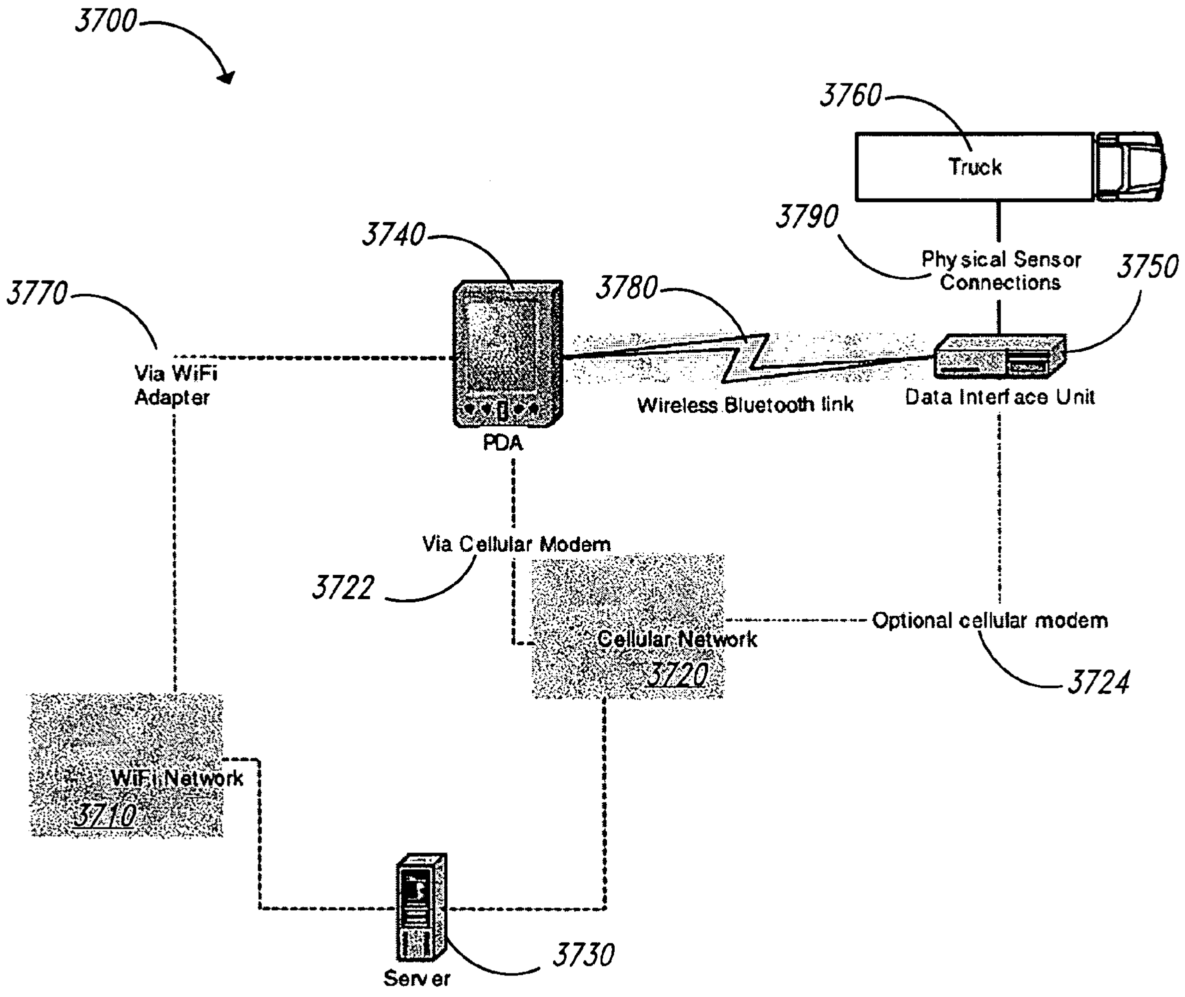

FIG. 37 is a schematic diagram of another embodiment of the present invention including a Personal Digital Assistant in accordance with principles of the present invention.

Figure 38:
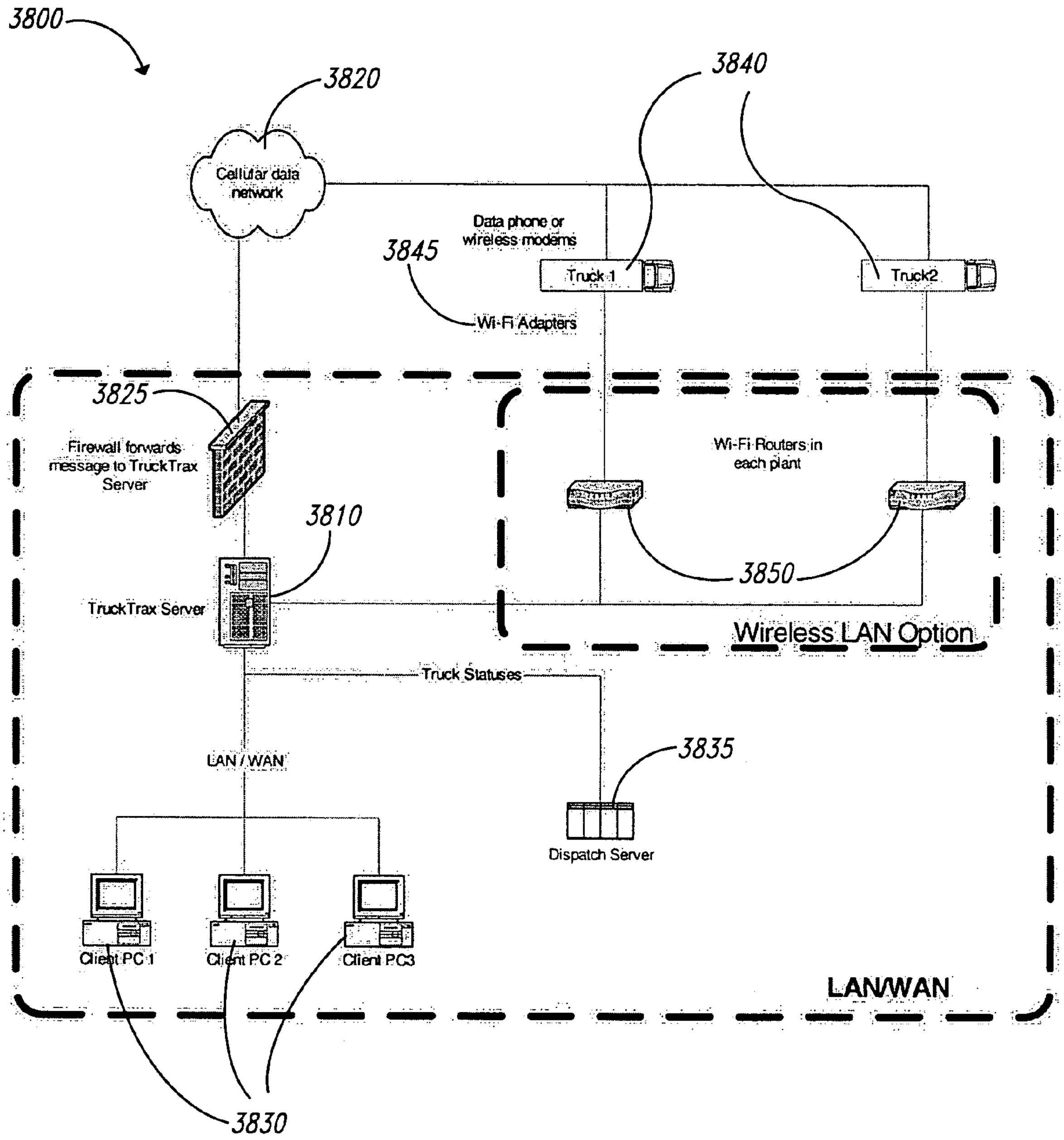

FIG. 38 is a schematic diagram of a network infrastructure design and data transmission in accordance with principles of the present invention.

Figure 39:
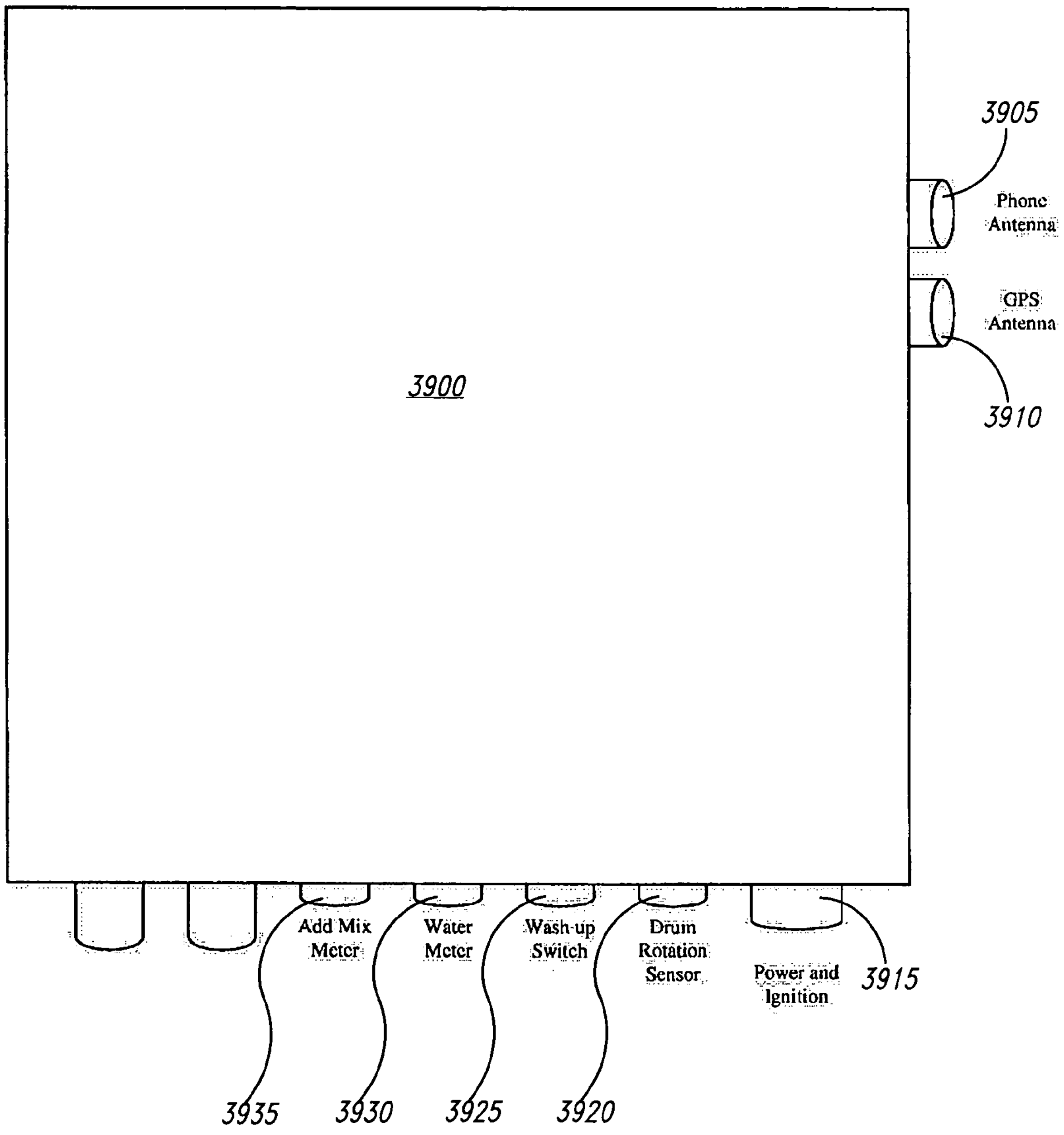

FIG. 39 is a schematic illustration of a general GPS box layout in accordance with principles of the present invention.

Figure 40A:
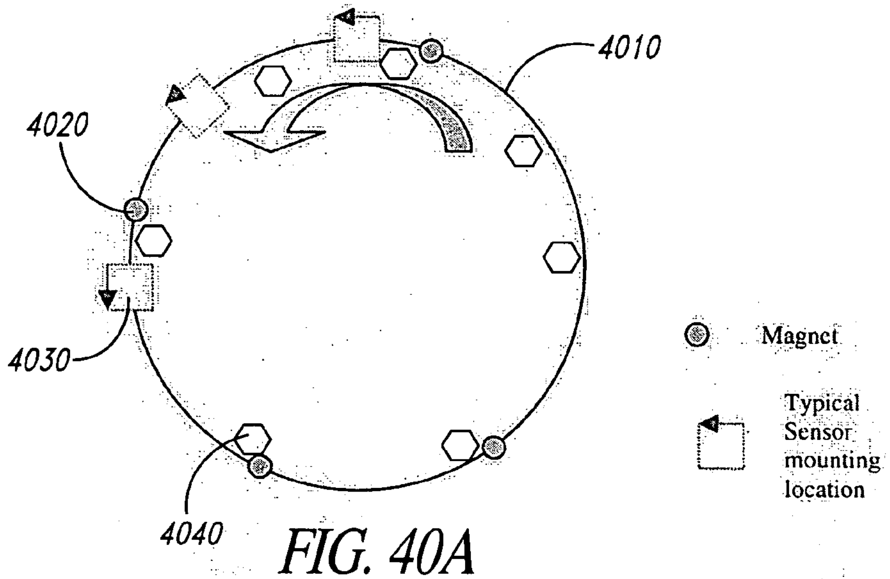
Figure 40B:
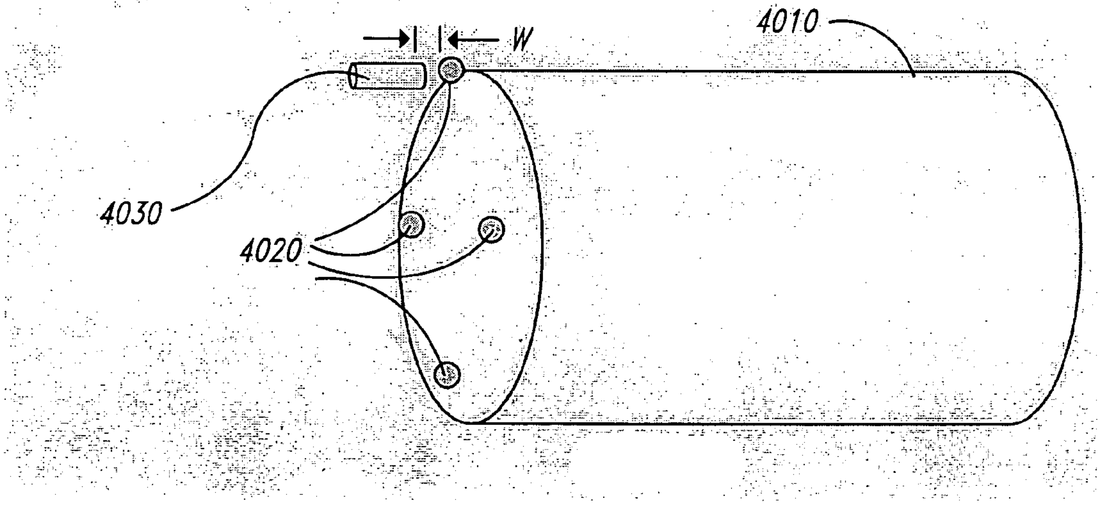

FIGS. 40A and 40B are schematic illustrations of the sensor positions on the drum of a concrete truck in accordance with principles of the present invention.

Figure 41:
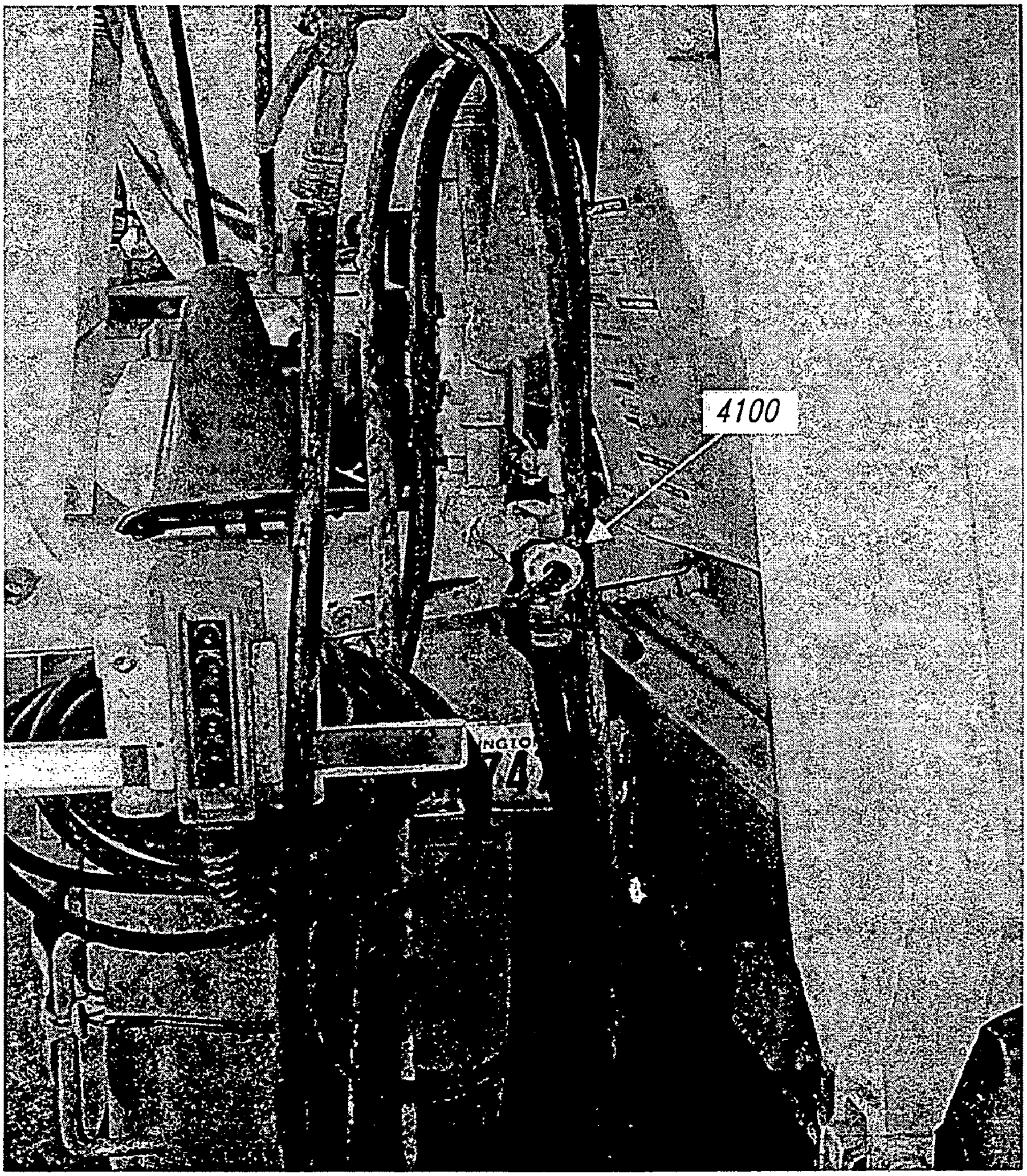

FIG. 41 is a photograph of a flow switch sensor positioned on a truck in accordance with principles of the present invention.

Figure 42:

FIG. 42 is a photograph of a GPS antenna mounted on a truck in accordance with principles of the present invention.

NOTATIONS AND NOMENCLATURE

The detailed descriptions that follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Sometimes these quantities take the form of electrical or magnetic signals capable of being stored, transferred, combined, compared and otherwise manipulated. It proves convenient at times, principally for reasons of common usage, to refer to these signals as sensors, transmissions, bits, data, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of the present invention; the operations are machine operations. Useful machines for performing the operation of the present invention include general-purpose digital computers, personal digital assistants (PDA), networking devices, wireless transmission devices, or similar devices.

The present invention also relates to apparatus for performing these operations. This apparatus may be specially constructed for the required purpose or it may comprise a general-purpose computer or PDA as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE INVENTION

The invention generally relates to an asset allocation and management system and apparatus for the same, and more particularly, to an asset allocation and management system for use with ready mix concrete delivery truck, multiple batch plants and multiple job sites. Asset allocation is particularly important in concrete delivery in part because it is a high cost resource, the concrete is delivered by specialized trucks, a batch plant is devoted to the manufacture of concrete, and once batched, the concrete has a limited usefulness. This invention seeks to increase the efficiency of each component of the delivery cycle, thereby increasing the value of the raw materials, the value of the truck and driver and the value of the batch plant. The efficient allocation and real time communication between trucks, jobs, dispatcher and batch plants will therefore maximize the value of each of these assets.

Each batch of concrete has a relatively consistent sequence of steps from the initial mix to the final placement of the concrete. The concrete mix is batched at the batch plant; the trucks are loaded with the concrete mix; the trucks leave the plant and travel to the jobsite; after arrival at the jobsite, the trucks discharge the concrete over a period of time; the drivers wash out the drum of the truck if possible and repeat the cycle as needed. In accordance with aspects of the present invention, each phase of this sequence is monitored and managed in order to produce an improved system of delivery. Additional customizable statuses can be inserted at any point in the sequence. For example, a Ready to Load status can be triggered whenever a truck enters the Ready to Load zone. Real time accurate information about each component of the system results in the most efficient use of the truck fleet as well as the batch plants.

The present invention is directed toward a GPS and wireless communications-enabled system for tracking and managing in real-time concrete ready-mix trucks. According to one embodiment of the system, the system includes; vehicle-mounted GPS receiver, sensors for drum rotation speed and direction, water and admixture flow to drum, and wash water flow indication; data interface unit that translates raw sensor data into standard RS232 signal, and monitors the power state of the entire system; a robust connection box housing a PC running on, for example, a Windows operating system for easy linkage with peripherals such as thermal printers (mobile paper tickets), signature capture pads (paperless tickets), Web cameras (rear truck vision), and magnetic card readers (COD orders); connection box-mounted cellular phone/modem to maintain the wireless link; and, PC displays or mobile data terminals for time management, route mapping and two-way messaging. This system includes a processing unit on the truck, thus allowing the driver to complete the transaction without additional communication with the server once the truck has left the plant. In accordance with aspects of the present invention, the data collection frequency is adjustable up to once per second.

The truck computer system communicates delivery status information, from loading to washout, via a wireless network. The connection boxes on-board the trucks are built as robust PCs running on a widely adopted platform such as the Microsoft business platform. The display screens feature maps, for order routing, and can relay driver messages and store vehicle performance data. A basic alternative to the PC display is the mobile data terminal that can receive and respond to text messages from the dispatch office.

Networking and Wireless Transmission of Data

The network may be, for example, a Local Area Network (LAN), a home network, or another type of network that can be implemented for functionality within the structure 100. As known to those skilled in the art, a LAN is a computer network that spans a relatively small area. Most LANs are confined to a single building or group of buildings. However, one LAN can be connected to other LANs over any distance via telephone lines and radio waves. A system of LANs connected in this way is called a wide-area network (WAN). Typically, most LANs connect workstations and personal computers. Each node (individual computer) in a LAN has its own processor (e.g., central processing unit or CPU) with which the node executes programs, but the node also is able to access data and devices anywhere on the LAN. This permits many users to share expensive devices, such as laser printers, as well as data. Users can also use the LAN to communicate with each other, by sending e-mail or engaging in chat sessions. There are many different types of LANs, with Ethernet LANs being the most common local networks for personal computers (PCs). Most Apple Macintosh networks are based on the AppleTalk™ network system from Apple Computer Corporation, which is built into Macintosh computers.

The following characteristics differentiate one LAN from another:

(1) Topology: This is a geometric arrangement of devices on the network. For example, devices can be arranged in a ring or in a straight line.

(2) Protocols: These are rules and encoding specifications for sending data. The protocols also determine whether the network uses a peer-to-peer or client/server architecture.

(3) Media: Devices can be connected by twisted-pair wire, coaxial cables, or fiber optic cables. Some networks communicate via wireless communication methods.

LANs are capable of transmitting data at very fast rates, and these rates are much faster than the data transmission rates over a telephone line. However, the distances covered by a LAN are limited, and there is also a limit on the number of computers that can be attached to a single LAN.

The Ethernet is a local-area network (LAN) architecture that uses a bus or star topology and supports data transfer rates of, for example, 10 megabits per second (Mbps), and is one of the most widely implemented LAN standards. The Ethernet specification served as the basis for the IEEE 802.3 standard, which specifies the physical and lower software layers. The Ethernet uses the carrier sense multiple access/collision detection (CSMA/CD) access method to handle simultaneous demands.

The 10Base-T standard (also commonly known as the Twisted Pair Ethernet) is one of several adaptations of the Ethernet (IEEE 802.3) standard for LANs. The 10Base-T standard uses a twisted-pair cable with maximum lengths of 100 meters. The cable is thinner and more flexible than the coaxial cable used for the 10Base-2 or 10Base-5 standards. Cables in the 10Base-T system typically connect with RJ-45 connectors. A star topology is common with 12 or more computers connected directly to a hub or concentrator. The 10Base-T system operates at about 10 Mbps and uses baseband transmission methods.

A version of Ethernet, known as 100Base-T (or Fast Ethernet), supports data transfer rates of 100 Mbps. Another version of Ethernet, known as Gigabit Ethernet, supports data rates of 1 gigabit (1,000 megabits) per second.

A network hub is a common connection point for devices in a network. Hubs are commonly used to connect segments of a LAN. A hub typically includes multiple ports. When a packet arrives at one port, it is copied to the other ports so that all segments of the LAN can see all packets. A passive hub serves simply as a conduit for the data, enabling it to go from one device (or segment) to another. In contrast, an intelligent hub includes additional features that enable an administrator to monitor the traffic passing through the hub and to configure each port in the hub. Intelligent hubs are also commonly known as manageable hubs. A third type of hub, known as a switching hub, actually reads the destination address of each packet and then forwards the packet to the correct port.

In networks technology, a "segment" is a section of a network that is typically bounded by bridges, routers, or switches. Dividing an Ethernet local area network (LAN) into multiple segments is one of the most common ways of increasing available bandwidth on the LAN. If segmented correctly, most network traffic will remain within a single segment, enjoying the full bandwidth supported by the media. Hubs and switches are typically used to interconnect computers within each segment, and switches can also interconnect multiple segments through the use of virtual LANs (VLANs).

In another embodiment, any one of the segments may be implemented as a wireless media that use a wireless transmission protocol. The wireless transmission method can, for example, permit the transmission of data from one segment to a hub to another segment. There are various suitable wireless transmission standards that can be used to transmit data in the network in accordance with an embodiment of the invention. For example, the Institute of Electrical and Electronics Engineers (IEEE) 802.11 Wireless Networking Standards provide various suitable wireless transmission standards. The IEEE 802.11 standards are a family of specifications developed by the IEEE for wireless LAN technology. The IEEE 802.11 standards specify an over-the-air interface between a wireless client and a base station or between two wireless clients. There are several specifications in the 802.11 family:

(1) 802.11 relates to wireless LANs and provides 1 or 2 Mbps transmission in the 2.4 GHz band using either frequency hopping spread spectrum (FHSS) or direct sequence spread spectrum (DSSS).

(2) 802.11a is an extension to 802.11 that applies to wireless LANs and provides up to 54 Mbps in the 5 GHz band. 802.11a uses an orthogonal frequency division multiplexing encoding scheme rather than FHSS or DSSS.

(3) 802.11b (also referred to as 802.11 High Rate or Wi-Fi) is an extension to 802.11 that applies to wireless LANS and provides 11 Mbps transmission (with a fallback to 5.5, 2 and 1 Mbps) in the 2.4 GHz band. 802.11b typically uses only DSSS. 802.11b allows wireless functionality comparable to Ethernet.

(4) 802.11g relates to wireless LANs and provides 20+Mbps in the 2.4 GHz band.

Another wireless transmission standard that can be used to transmit data in the network 115 is home radio frequency (or HomeRF). HomeRF is designed specifically for wireless networks in homes-in contrast to 802.11, which was created for use in businesses. HomeRF networks are designed to be more affordable to home users than other wireless technologies. Based on frequency hopping and using radio frequency waves for the transmission of voice and data, HomeRF typically has a range of up to about 150 feet. HomeRF uses Shared Wireless Access Protocol (SWAP) for wireless voice and data networking in the home. SWAP works together with the Public Switched Telephone Network (PSTN) network and the Internet through existing cordless telephone and wireless LAN technologies. SWAP supports time division multiple access (TDMA) for interactive data transfer and CSMA/CA for high-speed packet transfer. SWAP typically operates in the 2400 MHz band at 50 hops per second. Data travels at a rate between 1 Mbps and 2 Mbps. On a SWAP network via cordless handheld devices, users will be able to voice activate home electronic systems; access the Internet from anywhere in the home; and forward fax, voice and e-mail messages.

Another wireless transmission standard that can be used to transmit data in the network 115 is the "Bluetooth protocol," which is a computing and telecommunications industry specification that describes how mobile phones, computers, and personal digital assistants (PDAs) can easily interconnect with each other and with home and business phones and computers using a short-range wireless connection. Using this technology, users of cellular phones, pagers, and PDAs (such as the PalmPilot™) will be able to buy a three-in-one phone that can double as a portable phone at home or in the office, get quickly synchronized with information in a desktop or notebook computer, initiate the sending or receiving of a fax, initiate a print-out, and in general, have all mobile and fixed computer devices be totally coordinated.

Bluetooth requires that a low-cost transceiver chip be included in each device. The transceiver transmits and receives in a previously unused frequency band of 2.45 GHz that is available globally (with some variation of bandwidth in different countries). In addition to data, up to three voice channels are available, as an example. Each device has a unique 48-bit address from the IEEE 802 standard. Connections can be point-to-point or multipoint. The maximum range is 10 meters, as an example. Data can be exchanged at a rate of 1 megabit per second (up to 2 Mbps in the second generation of the technology), as an example. A frequency hop scheme allows devices to communicate even in areas with a great deal of electromagnetic interference. Built-in encryption and verification is provided. Thus, the Bluetooth protocol can simplify communications among networked devices and between devices and the Internet. The Bluetooth protocol also aims to simplify data synchronization between networked devices and other computers.

Other wireless transmission standards that can be used to transmit data in the network can include, for example, Digital Enhanced Cordless Telecommunications (DECT) technology, or the Apple Airport™ wireless transmission system. It is appreciated that other suitable techniques and standards usable by an embodiment of the invention would be familiar to those skilled in the art having the benefit of this disclosure.

Data Transfer

As shown in FIG. 38 and in accordance with aspects of the current invention, the tracking system 3800, which is also referred to as the TruckTrax system, has a server 3810 residing within the customer's network. Truck data arrives via the cellular data network 3820 through customer's firewall 3825 using User Datagram Protocol (UDP) at a customizable frequency (once per minute is the default). Data packets are routed by the firewall directly to the TruckTrax server 3810, where it is interpreted and stored. In the exemplary embodiment, Microsoft SQL Server is used on the TruckTrax server 3810 for data storage. Client software, such as the real time truck tracking software, is installed on the client computers 3830 and accesses the TruckTrax server 3810 via customer's local/wide area network. A dispatch server 3835 provides truck status information.

Wireless LAN allows transmission of large amount of data between trucks 3840 and the server 3810 without a data usage charge. WiFi adapters 3845 would be installed in all trucks, and WiFi routers 3850 would be placed in each plant to route data back to the TruckTrax Server 3810 via customer's local/wide area network. If both cellular network and WiFi coverage are present, the system will automatically send all data through WiFi.

Regardless of the transmission medium, cellular network or WiFi, the transmitted data are buffered on the transmitter system: the truck system or the server, until an acknowledgement signal is received indicating a successful transmission and reception. If no acknowledgement signal is received, a ping messages is sent for all subsequent iterations until a reply is received. At that time, the buffered data is resent, and transmission-acknowledgement sequence is repeated.

Figure 1A:
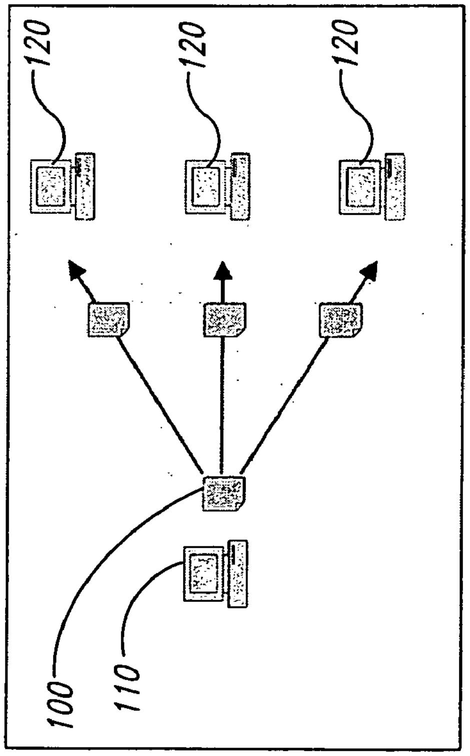
FIGS. 1A–1D are schematic illustrations of exemplary peer-to-peer file transfers in accordance with principles of the present invention.
Figure 1B:
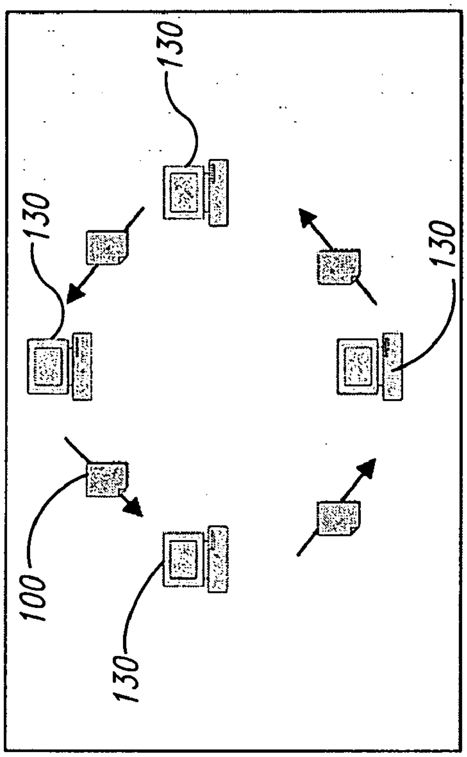
Figure 1C:
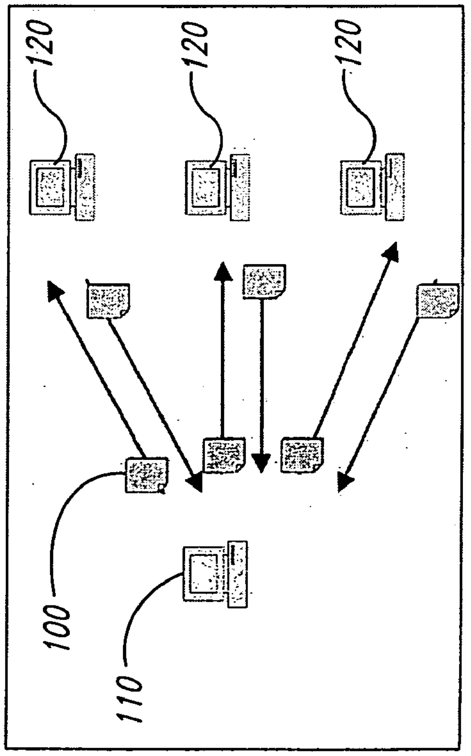
Figure 1D:
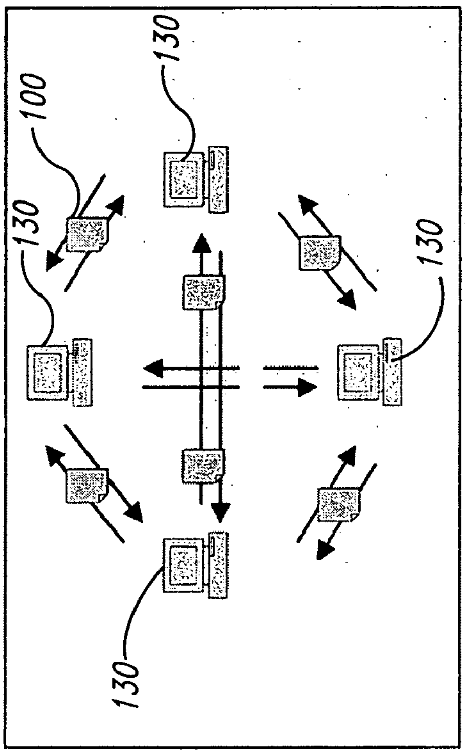

FIGS. 1A–1D illustrate user defined file transfer mesh options to give the system user the flexibility of pushing data in many different ways in accordance with aspect of the present invention. In FIGS. 1A and 1C, data 100 is transferred from a master host 110 to a slave host 120. In FIG. 1C, the data 100 is also transferred from the slave host 120 back to the master host 110 in a bi-directional system. In FIG. 1B, data 100 is transferred from Peer-to-Peer from peer host 130 to peer host 130 in a circular configuration. In FIG. 1D, data 100 is transferred from Peer-to-Peer, traveling to and from various peer hosts 130, as illustrated in a complete mesh configuration.

Figure 2:
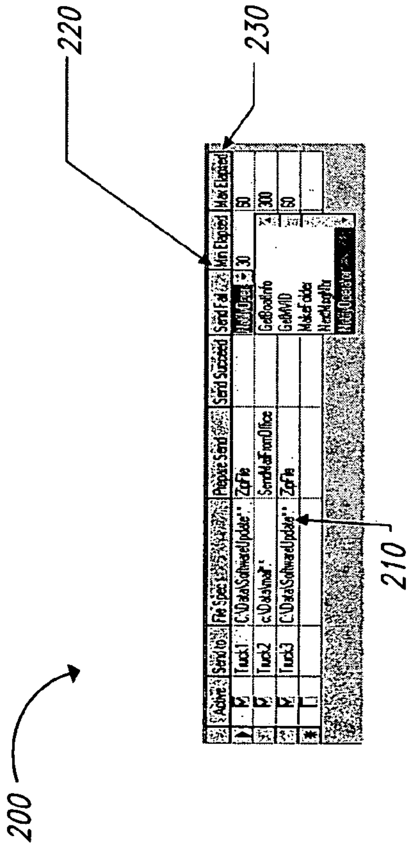
FIG. 2 is a screenshot illustrating the selection of files for transfer in accordance with principles of the present invention.

FIG. 2 illustrates a screenshot 200 illustrating the selection of files for transfer in accordance with principles of the present invention. A user selects a file 210 to transfer by the specific file name or by wildcard selection. The file transfers are controlled through custom event driven scripts 220. The timing of the file transfer is based on file modifications 230 within a minimum elapsed time or trigger period based on a maximum elapsed time. Thus, the user has control over what file is transferred, how the file is transferred and when the file is transferred.

Figure 3:
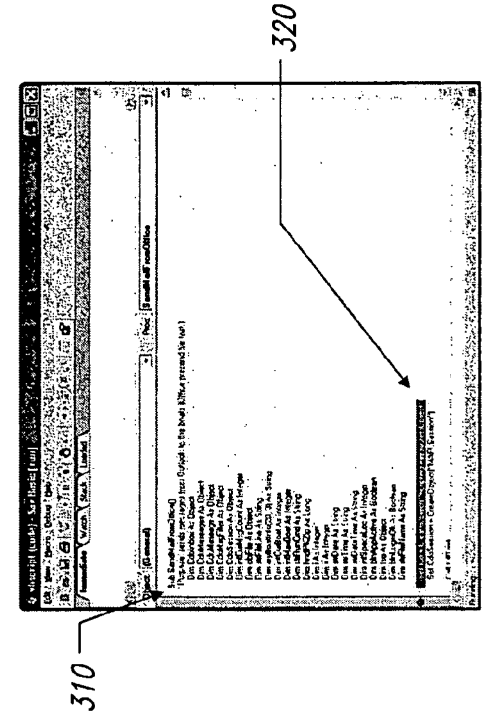
FIG. 3 is a screenshot illustrating extended basic file transfers in a scripting environment in accordance with principles of the present invention.

FIG. 3 illustrates a screenshot 200 illustrating extended basic file transfers in a scripting environment in accordance with principles of the present invention. A user can build scripts to prepare files before transfer, perform post transfer operations, or manage transfer failure actions within for example, SAX Basic™ scripting environment. Custom scripts 310 for controlling the file transfers may be completed using the integrated SAX Basic™ development environment. In addition, the user may set breakpoints and check variable values via the watch list 320.

Figure 4:
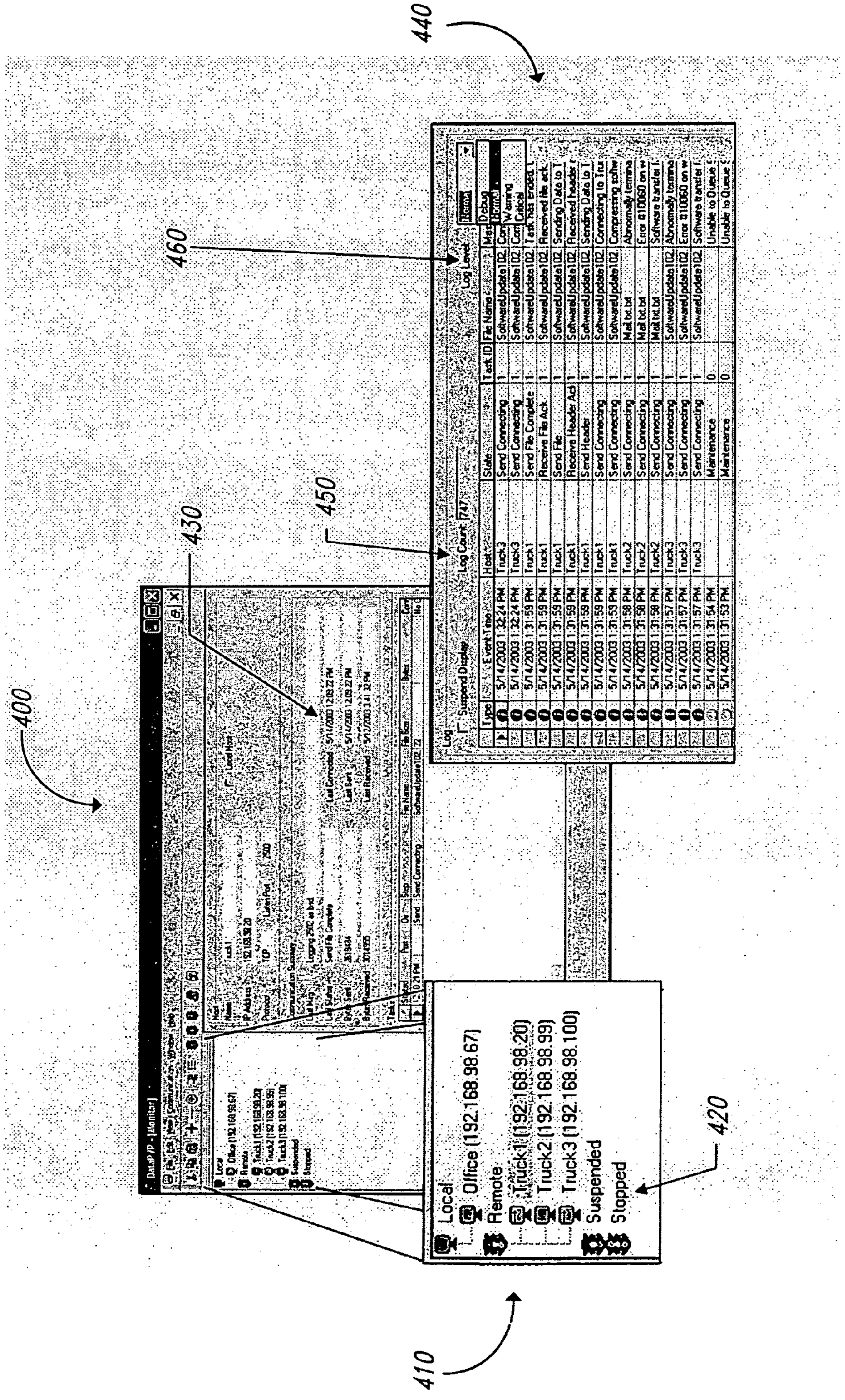
FIG. 4 is a screenshot illustrating the tracking and troubleshooting of file transfers in accordance with principles of the present invention.

FIG. 4 illustrates a screenshot 400 illustrating the tracking and troubleshooting of file transfers in accordance with principles of the present invention. According to aspects of the present invention, a user can monitor file transfers and troubleshoot problems with a variety of tools. As illustrated in the enlarged portion 410 of the screen, communication status 420 is displayed and monitored in real time. Further, detailed statistics 430 are maintained for each host or truck. All transmissions can be monitored in the communication log 440, including number of transmissions 450; transmission errors; and transmission status. The level of detail 460 contained in the log is adjustable between debug, normal, warning and critical.

Advantages of the above referenced data transfer system are numerous. A single application serves both the client and the server. The data transfer system uses efficient "push" technology to send files only when needed. Files may be transferred by name or by wildcard expression. Many variables of the data transfer are controllable; including the ability to define file transfer intervals based on file modifications or set a fixed interval, ad-hoc, or immediate file transfer. The system includes a fully user definable file transfer mesh. Powerful BASIC-like scripting engine is integrated into the system for performing user-defined tasks before and after file transfer. According to further aspects of the present invention, COM interface is available for maintaining host lists and running scripts from externally driven events. The system further includes reliable, user configurable TCP based file transfers. The system allows for off-line or unreachable hosts, and further provides a log of all communication transmissions. According to additional aspects of the present invention, the system includes script debuggers for troubleshooting user-defined scripts. In accordance with still further aspects of the present invention, the data transfer application of the present invention has a modern interface toolbar, tear-off menus and components, multiple windows and the like.

Server for Exceptions

The truck tracking system of the present invention has a server for exceptions that continuously monitors incoming data from all trucks and identifies exception events in real-time. Exception events include, for example, the following: loaded status at the shop; driver on over-time; driver on double-time; driver eligible for lunch; truck stopped for greater than 5 minutes while in return status; "On Job" status greater that 15 minutes without transitioning to "Pour Status;" and a message from the driver. Exception logic is defined in an editable script file that executes on the data server. Thus, the server for exceptions can be readily customized by the end-user with respect to function.

Figure 5:
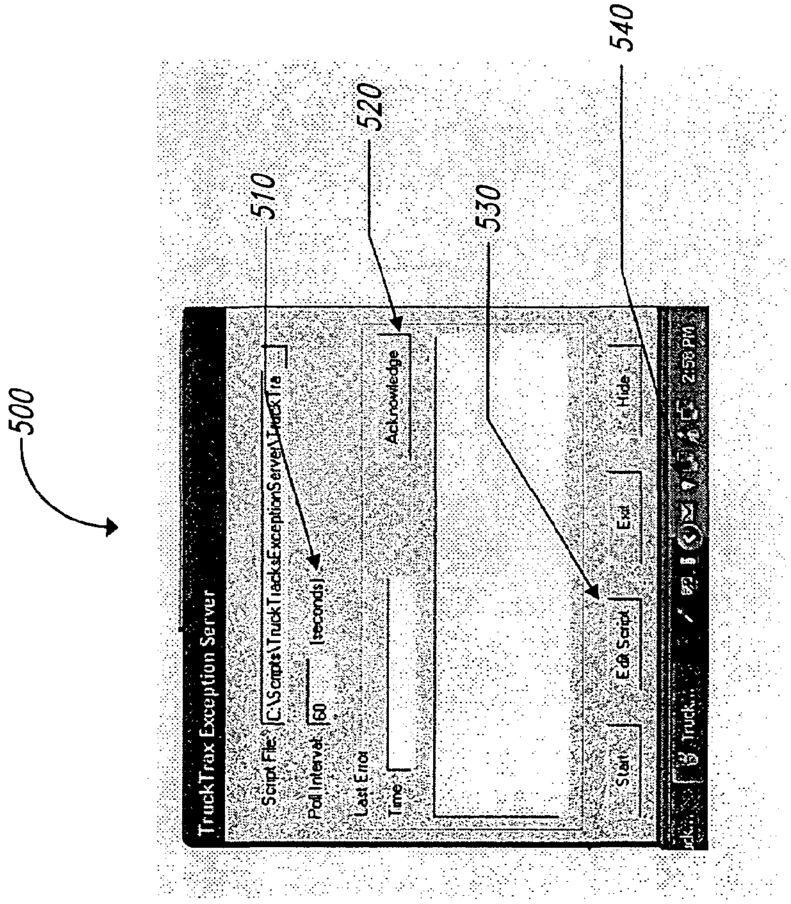
FIG. 5 is a screenshot illustrating the exception tracking server in accordance with principles of the present invention.

FIG. 5 is a screenshot 500 illustrating the server for tracking exceptions in accordance with principles of the present invention. The server for exceptions runs silently in the system tray on any PC that has connectivity to the truck tracking system's database. The user defines a frequency for exception polling in the Poll Interval 510 box. The unit of measure for the interval is in seconds and as illustrated, 60 seconds is one exemplary embodiment of a poll interval. The user can edit and debug the exceptions script directly from the exceptions server by clicking the Edit Script button 530. The user can further track script errors in the exceptions server for easy debugging by clicking on the "Acknowledge" button 520. The icon 540 represents the low overhead server running from the system tray and provides notification of script errors.

Figure 6:
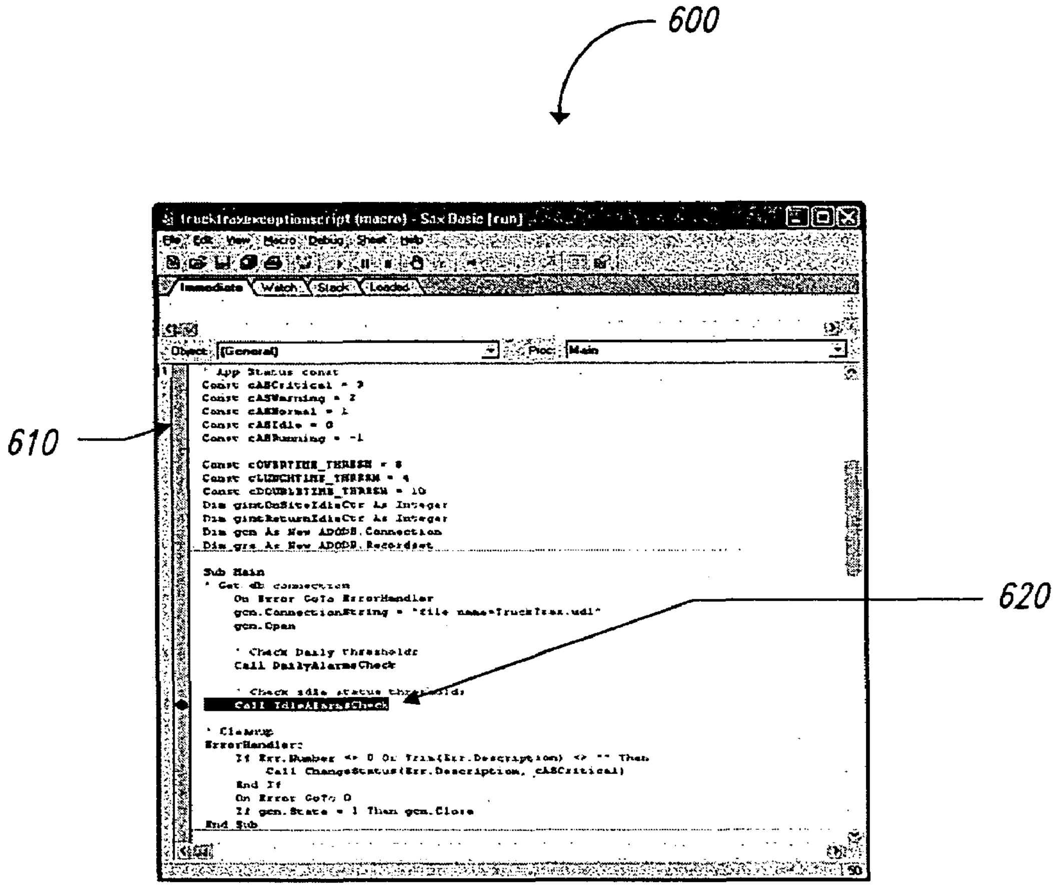
FIG. 6 is a screenshot illustrating a custom exception report in accordance with principles of the present invention.

FIG. 6 is a screenshot 600 illustrating a custom exception report in accordance with principles of the present invention. The fully user configurable script allows the user to customize the recordation of exceptions. Custom scripts 610 are illustrated for recording exceptions using the integrated SAX Basic™ development environment. The user may further set breakpoints and check variables values via the watch list 620.

Figure 7:
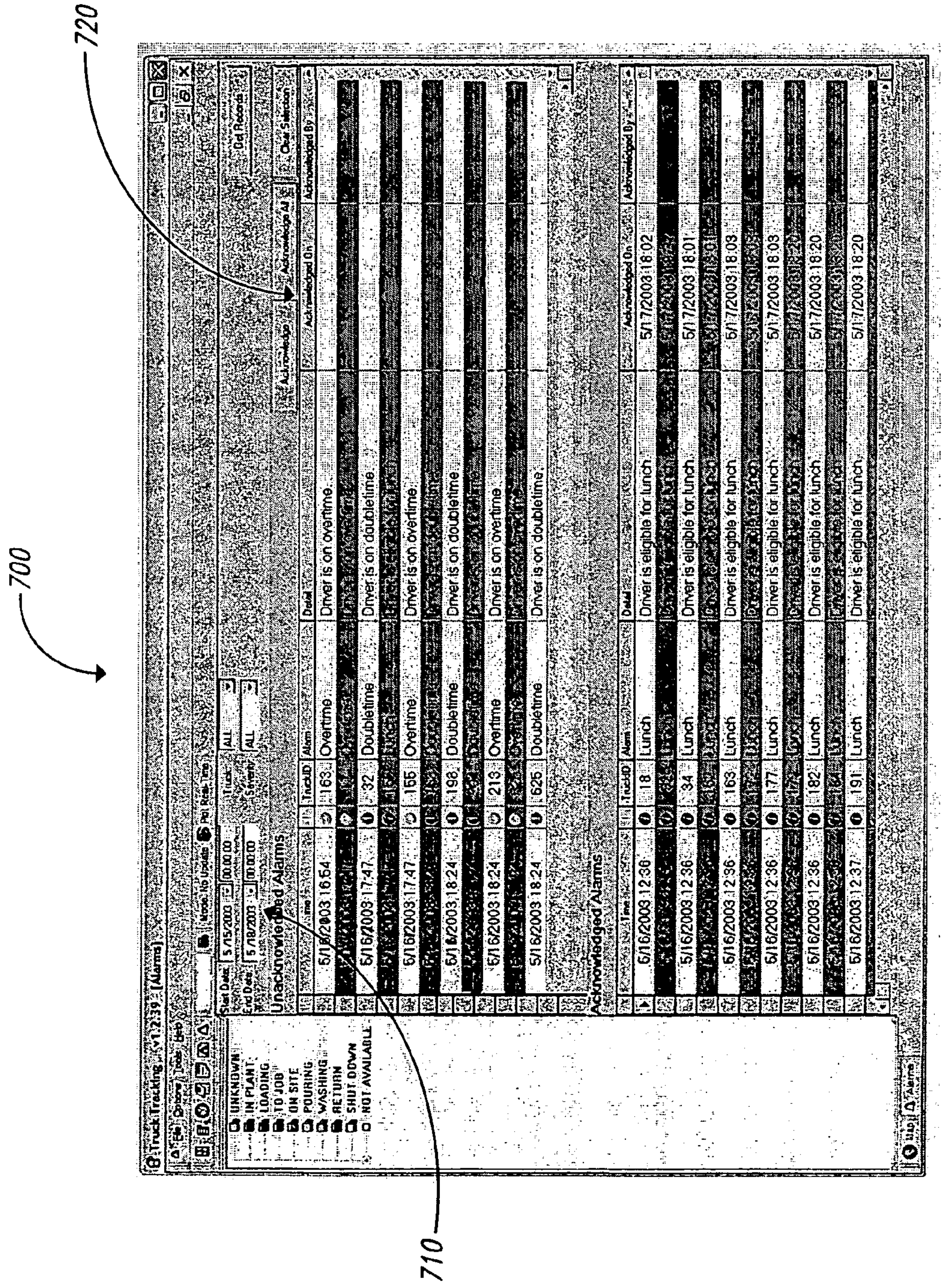
FIG. 7 is a screenshot illustrating the review and acknowledge exceptions screen in accordance with principles of the present invention.

FIG. 7 is a screenshot 700 illustrating the review and acknowledge exceptions screen in accordance with principles of the present invention. Exceptions may be reviewed by date 710 or by truck. The flexible filter criterion allows the user to filter alarms by date, truck and even severity. The alarms can be acknowledged individually, or all displayed alarms can be acknowledged at once 720.

According to aspects of the present invention, the exceptions server application has many advantages, including the following: raise custom exception events in real-time; has a powerful BASIC-like scripting engine for performing user-defined exception tracking and reporting; includes script debugger for troubleshooting user defined scripts; user controllable local alarm indicator and messaging aides troubleshooting of scripts; exception reporting frequency is user definable; review and acknowledge exceptions by day or truck directly in the system; runs from the system tray; can run from any workstation or server with connectivity to the system database;.

Below is one example of a sample exception script in accordance with principles of the present invention:

Sample Exception Script - Check for Lunch and Overtime

```
Sub DailyAlarmsCheck( )
' Check if truck is eligible for lunch, is in overtime or doubletime status
On Error GoTo ErrorHandler
' Get current truck status data
grs.Open "p_get_truck_day_length", gcn
If grs.State = 1 Then
  If Not (grs.EOF And grs.BOF) Then
    Do While Not grs.EOF
      ' Lunchtime check
      If grs("day_length") > cLUNCHTIME_THRESH Then
        gcn.Execute "p_ins_alarm @AlarmTruckCode = " &
            CStr(grs("truck_id")) & _
          ", @AlarmCode=1" & _
        ", @AlarmDescription='Driver is eligible for lunch.'"
      End If
      ' Overtime check
      If grs("day_length") > cOVERTIME_THRESH Then
        gcn.Execute "p_ins_alarm @AlarmTruckCode = " &
            CStr(grs("truck_id")) & _
        ", @AlarmCode=2" & _
        ", @AlarmDescription='Driver is on overtime.'"
      End If
      ' Doubletime check
      If grs("day_length") > cDOUBLETIME_THRESH Then
        gcn.Execute "p_ins_alarm @AlarmTruckCode = " &
            CStr(grs("truck_id")) & _
          ", @AlarmCode=3" & _
          ", @AlarmDescription='Driver is on doubletime.'"
      End If
      grs.MoveNext
    Loop
  End If
End If
' Cleanup
ErrorHandler:
  If Err.Number <> 0 Or Trim(Err.Description) <> "" Then
    Call ChangeStatus(Err.Description, cASCritical)
  End If
  On Error GoTo 0
  If grs.State = 1 Then grs.Close
End Sub
```

Truck Status Script

In accordance with the above aspects of the present invention, the location of each truck is tracked, the status of each driver is monitored, and the status of each load is monitored. The status of each driver is monitored so that trucks that are on overtime or near overtime are sent home while trucks and truck drivers with additional time remaining on their regular time shift are utilized. This helps to reduce the overtime hours paid to drivers. Further, the system monitors the time a driver has been working so that messages such as "go to lunch" are sent to the driver.

Sample Truck Status Script—on Job Status Logic

The real-time truck status logic is deployed as an editable script file on each truck computer. The present system supplies a default script file that utilizes sensor signals such as GPS, drum speed and direction sensor, and wash water flow to determine the current truck status. The status calculation logic can be easily modified to conform to end user business rules or to add custom status logic.

The status logic script file can be updated remotely using the DataP2P application illustrated in FIG. 1 to push the current version to every truck.

Sample Truck Status Script

```
'Check if truck is on job site
680 If pstCurrentStat = ToJob Then
  'check for distance from order
690     dblDistancefromOrder = CalcDist(rstCurrentTruckData!
        Longitude, rstCurrentTruckData!Latitude, psngOrderLong,
        psngOrderLat)
700 If pblnStatCalcLogging Then
710     strMsg = "ToJob. Ticket: " & plngCurrentTicketNum &
              " Dist From order: " &
          Format$(dblDistancefromOrder, "#.###E+00")
720 LogStatCalcDetail (strMsg)
730 End If
740 If dblDistancefromOrder < IIf(psngOrderRadius > 0,
              psngOrderRadius, JOB_RADIUS)      Then
750     ChangeStatus (OnJob)
760     If pblnStatCalcLogging Then
770             strMsg = "Change Stat to OnJob. Ticket: "
              & plngCurrentTicketNum &
            " Dist From order: " & Format$(dblDistancefromOrder,
              "#.###E+00")
780         LogStatCalcDetail (strMsg)
790   End If
800  End If
810 End If
```

Sample Truck Status Script—in Plant Status Logic

In accordance with another aspect of the invention, the following is an exemplary script for the real-time truck status logic with regard to an in plant calculation.

Script for IN PLANT calculation:

```
  '--Check if Truck is IN PLANT
  '--Distances are in miles
  'Calculate distance to ticketing plant
  If rstCurrentTruckData!Longitude <> 0 And rstCurrentTruckData!
  Latitude
<> 0 Then
    dblDistanceFromPlant = CalcDist(rstCurrentTruckData!Longitude, _
    rstCurrentTruckData!Latitude, psngPlantLong, psngPlantLat)
  Else
    dblDistanceFromPlant = 1000
  End If
  If pstCurrentStat < InPlant Or pstCurrentStat = ReturnToPlant Or
pstCurrentStat = ToJob Then
    'Calculate distance to the nearest plant
    dbldistance FromNearest Plant                    =
CalcDistToNearestPlant(rstCurrentTruckData!Longitude, _
    rstCurrentTruckData!Latitude, pintNearestPlantCode, intPlantIndex)
    If pintNearestPlantCode <> 0 Then
      sngNearestPlantRadius = locPlants(intPlantIndex).Radius
    Else
      sngNearestPlantRadius = IN_PLANT_RADIUS
    End If
    'Compare calculated distance to the plant radius
    If pstCurrentStat = ToJob Then
      If dbldistanceFromNearestPlant < sngNearestPlantRadius Then
        ChangeStatus(InPlant)
        GoTo NextRecord
      End If
    End If
    'Compare calculated distance to the plant radius
    If pstCurrentStat <> ToJob Then
      If  (dblDistanceFromPlant  <=  IIf(psngPlantRadius  >  0,
psngPlantRadius, IN_PLANT_RADIUS) _
      Or dbldistanceFromNearestPlant < sngNearestPlantRadius) Then
        ChangeStatus(InPlant)
        GoTo NextRecord
      End If
    End If
  End If
```

Figure 8:
FIG. 8 is a screenshot from a PDA mounted in a truck, illustrating the map screen in accordance with principles of the present invention.

In addition to determining truck status, the computer or PDA on board the truck serves as a communication means between the dispatcher and the driver. The display may be used to show a map, send messages, provide status information, provide a review of an electronic ticket, provide a signature box, and the like. FIG. 8 is a screenshot from a PDA mounted in a truck, illustrating the map screen in accordance with principles of the present invention. This is the screen seen by the driver. From this touch screen, the driver can locate the jobsite, zoom in on the map and check the route.

Figure 9:
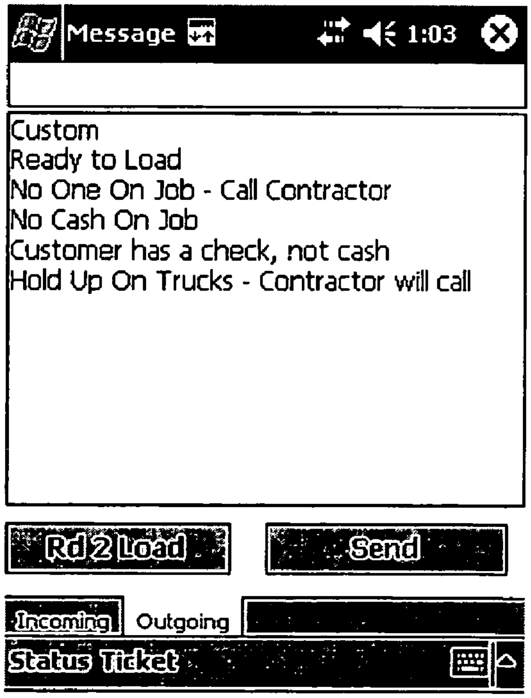
FIG. 9 is a screenshot from a PDA mounted in a truck, illustrating the message screen in accordance with principles of the present invention.

FIG. 9 is a screenshot from a PDA mounted in a truck, illustrating the message screen in accordance with principles of the present invention. The messages can be sent from the dispatcher to the driver, or alternatively, from the driver to the dispatcher. As shown in FIG. 9, in this exemplary embodiment, the driver may select from standard messages or may prepare a custom message.

Figure 10:
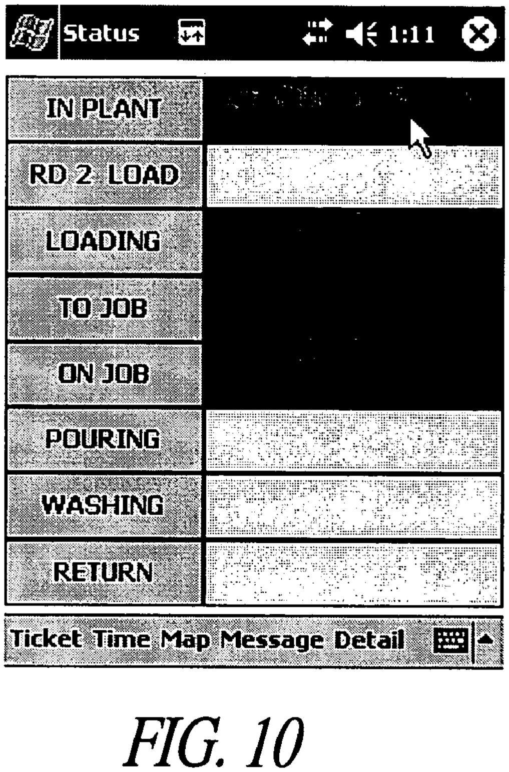
FIG. 10 is a screenshot from a PDA mounted in a truck, illustrating the status screen in accordance with principles of the present invention.

FIG. 10 is a screenshot from a PDA mounted in a truck, illustrating the status screen in accordance with principles of the present invention. From this screen, the driver can review various times in the delivery sequence for this load. Also from this screen, the driver can switch to viewing the electronic ticket, the time clock, the map, or the message screen. As noted earlier, the delivery cycle for ready mix concrete delivery is typically divided into the following timed points: in plant, ready to load; loading; to job; on job; pouring; washing; and return. This sequence is exemplary and other timed points could be set and monitored in accordance with the principles of the present invention.

Figure 11:
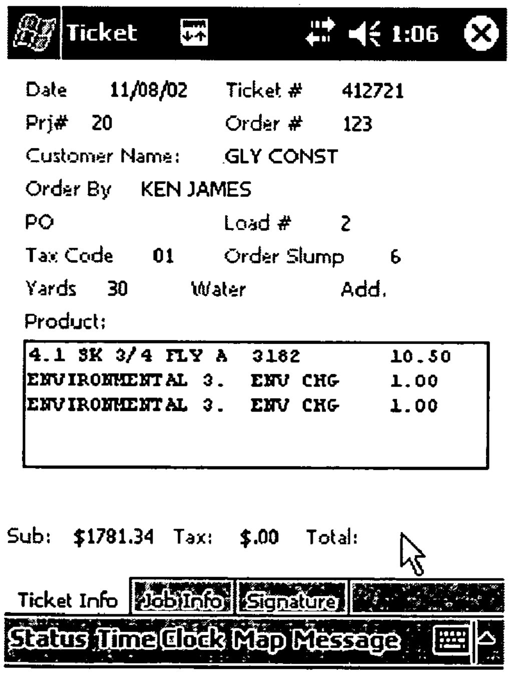
FIG. 11 is a screenshot from a PDA mounted in a truck, illustrating an electronic ticket screen in accordance with principles of the present invention.
Figure 12:
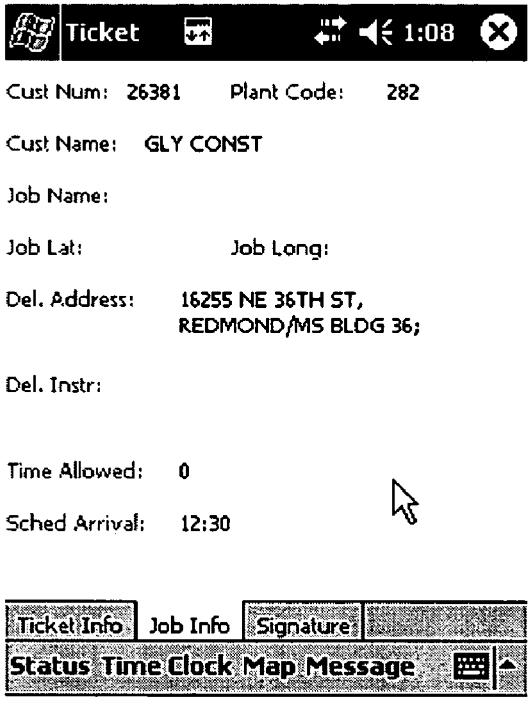
FIG. 12 is a screenshot from a PDA mounted in a truck, illustrating an electronic ticket screen in accordance with principles of the present invention.
Figure 13:
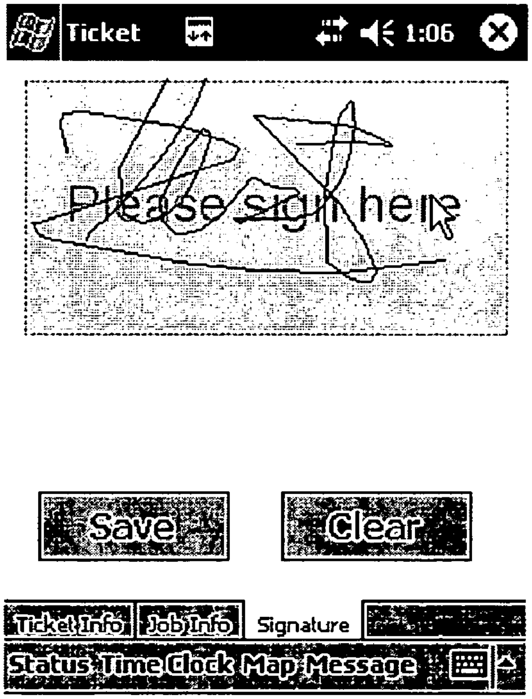
FIG. 13 is a screenshot from a PDA mounted in a truck, illustrating the signature screen of the electronic ticket in accordance with principles of the present invention.

FIG. 11 is a screenshot from a PDA mounted in a truck, illustrating an electronic ticket screen in accordance with principles of the present invention. This view of the electronic ticket illustrates the ticket information, including the date, order number, project number, customer name, ordered by name, purchase order number, load number in the order, tax code, ordered slump, total yards ordered, water added, additives added, product descriptions including mix design and quantity, subtotal, tax and total costs. All of this information is either automatically entered when the job description is entered or is retrieved from sensors positioned on the truck. The driver does not have to enter information into the electronic ticket, thus reducing human error. From the bottom of the screen, three tabs are visible: ticket info, job info, and signature. FIG. 12 illustrates the screenshot viewable from the job info screen of the electronic ticket, and FIG. 13 illustrates the screenshot viewable from the signature screen of the electronic ticket.

Figure 14:
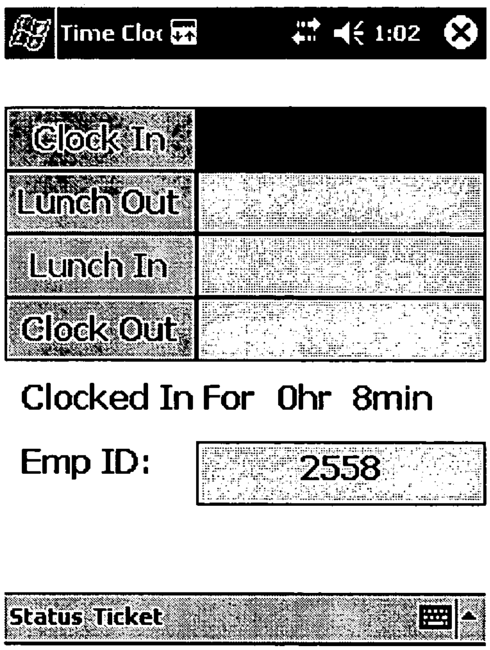
FIG. 14 is a screenshot from a PDA mounted in a truck, illustrating the time clock screen in accordance with principles of the present invention.

FIG. 14 is a screenshot from a PDA mounted in a truck, illustrating the time clock screen in accordance with principles of the present invention. In this screen, the driver simply enters his or her employee identification number (see FIG. 17) and clocks in for work.

Figure 15:
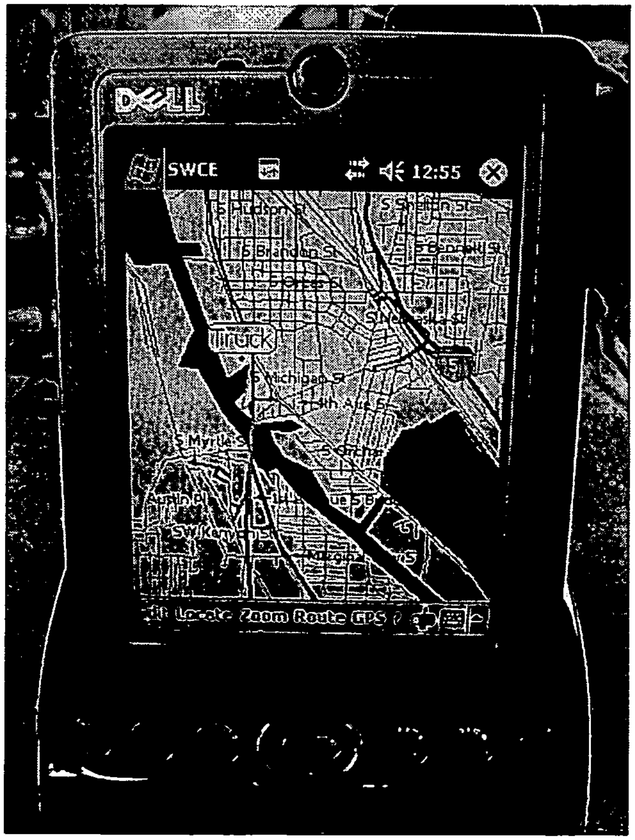
FIG. 15 is an illustration of a PDA mounted in a truck, containing a screenshot of the map screen thereon, in accordance with principles of the present invention.
Figure 16:
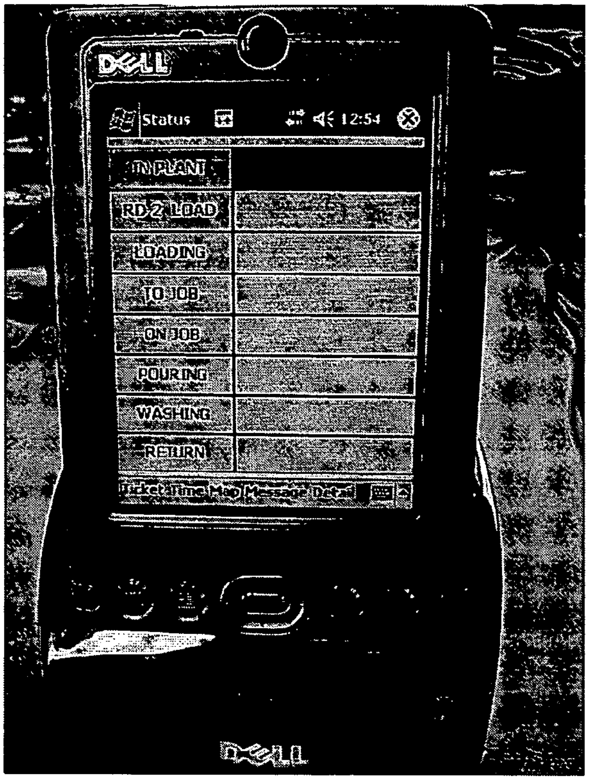
FIG. 16 is an illustration of a PDA mounted in a truck, containing a screenshot of the status screen thereon, in accordance with principles of the present invention.
Figure 17:
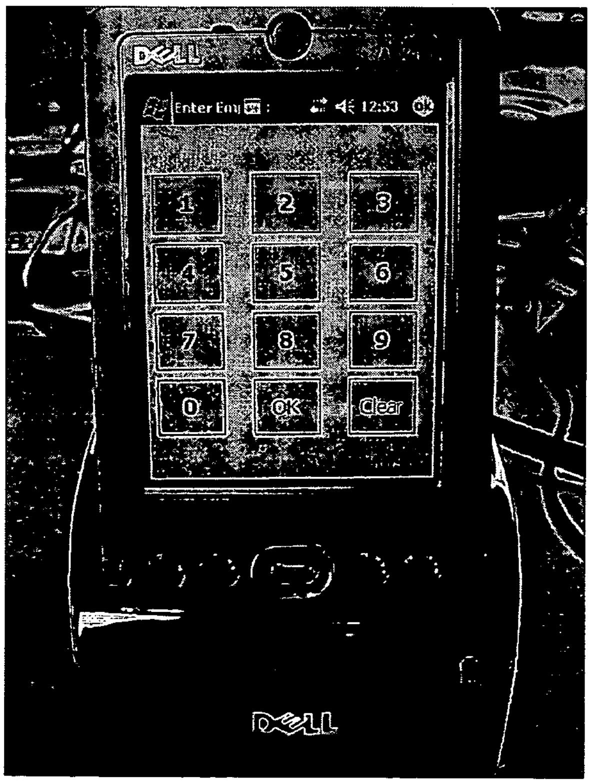
FIG. 17 is an illustration of a PDA mounted in a truck, containing a screenshot of the employee number entry screen thereon, in accordance with principles of the present invention.

FIG. 15 is a photograph of the PDA embodiment, containing a screenshot of the map screen thereon, in accordance with principles of the present invention. The cradle of the PDA is mounted in the truck in a conveniently accessible location for the driver. FIG. 16 is a photograph of a PDA mounted in a truck, containing a screenshot of the status screen thereon, in accordance with principles of the present invention. FIG. 17 is a photograph of a PDA mounted in a truck, containing a screenshot of the employee number entry screen thereon, in accordance with principles of the present invention.

Figure 18:
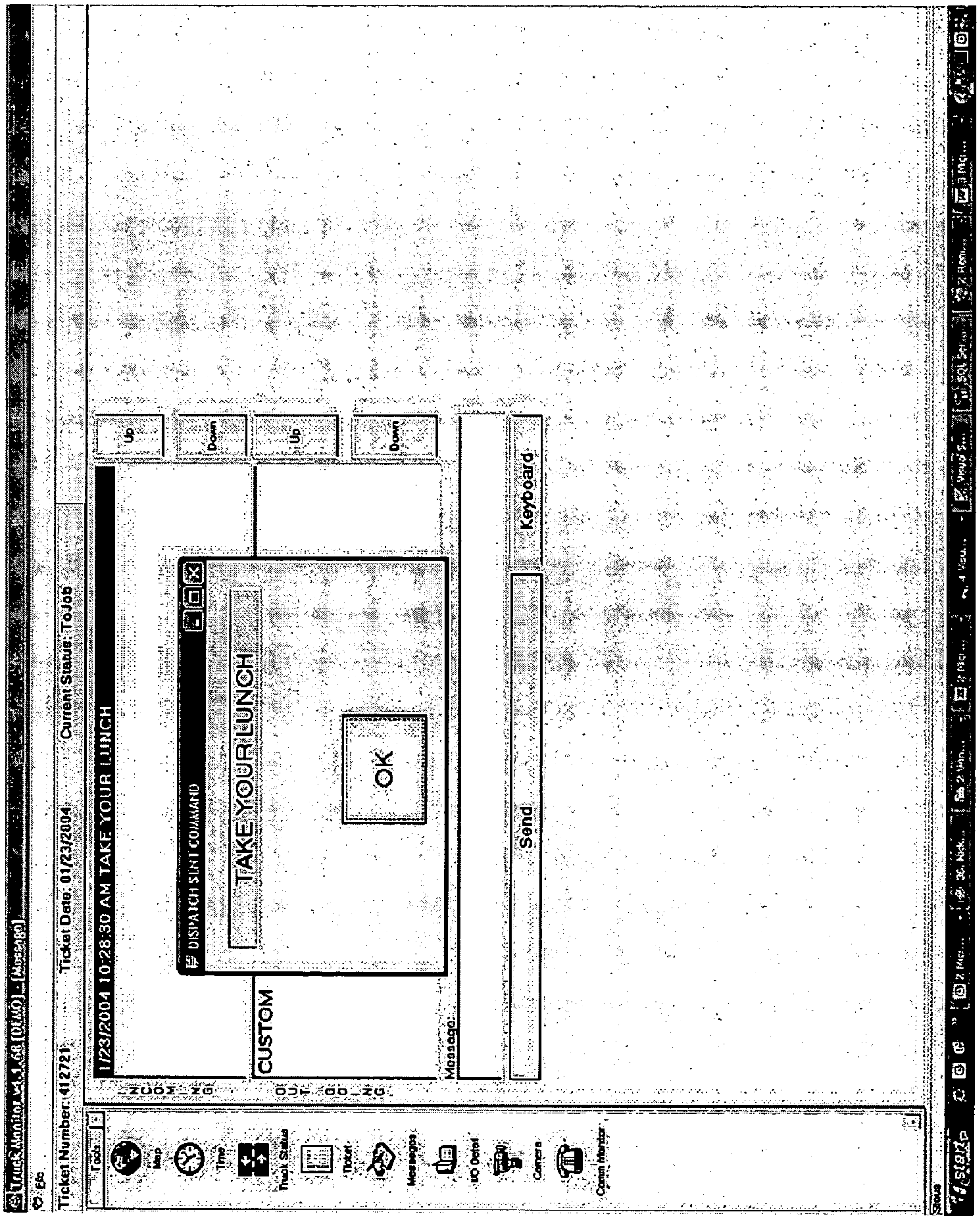
FIG. 18 is a screenshot from a CPU mounted in a truck, illustrating a message screen in accordance with principles of the present invention.

FIG. 18 is a screenshot from a PDA embodiment, illustrating a message screen in accordance with principles of the present invention. Notice how the display screen changes depending on whether the system includes a CPU mounted in the truck (as shown here) or a PDA mounted in the truck. The dispatcher can transmit the message displayed herein, and then can further monitor the status of the truck to ensure the driver takes lunch as instructed.

Figure 19:
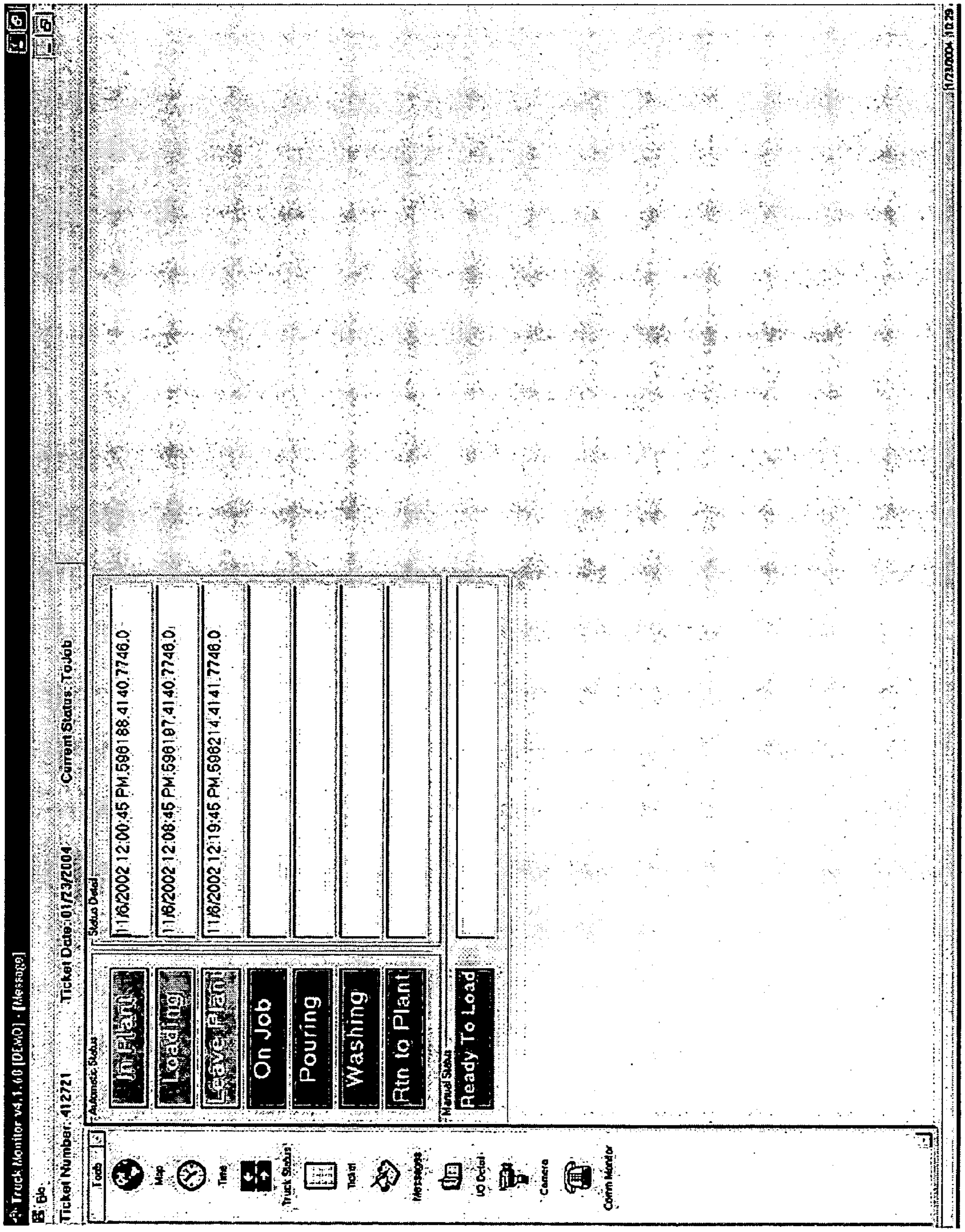
FIG. 19 is a screenshot from a CPU mounted in a truck, illustrating a status screen in accordance with principles of the present invention.
Figure 20:
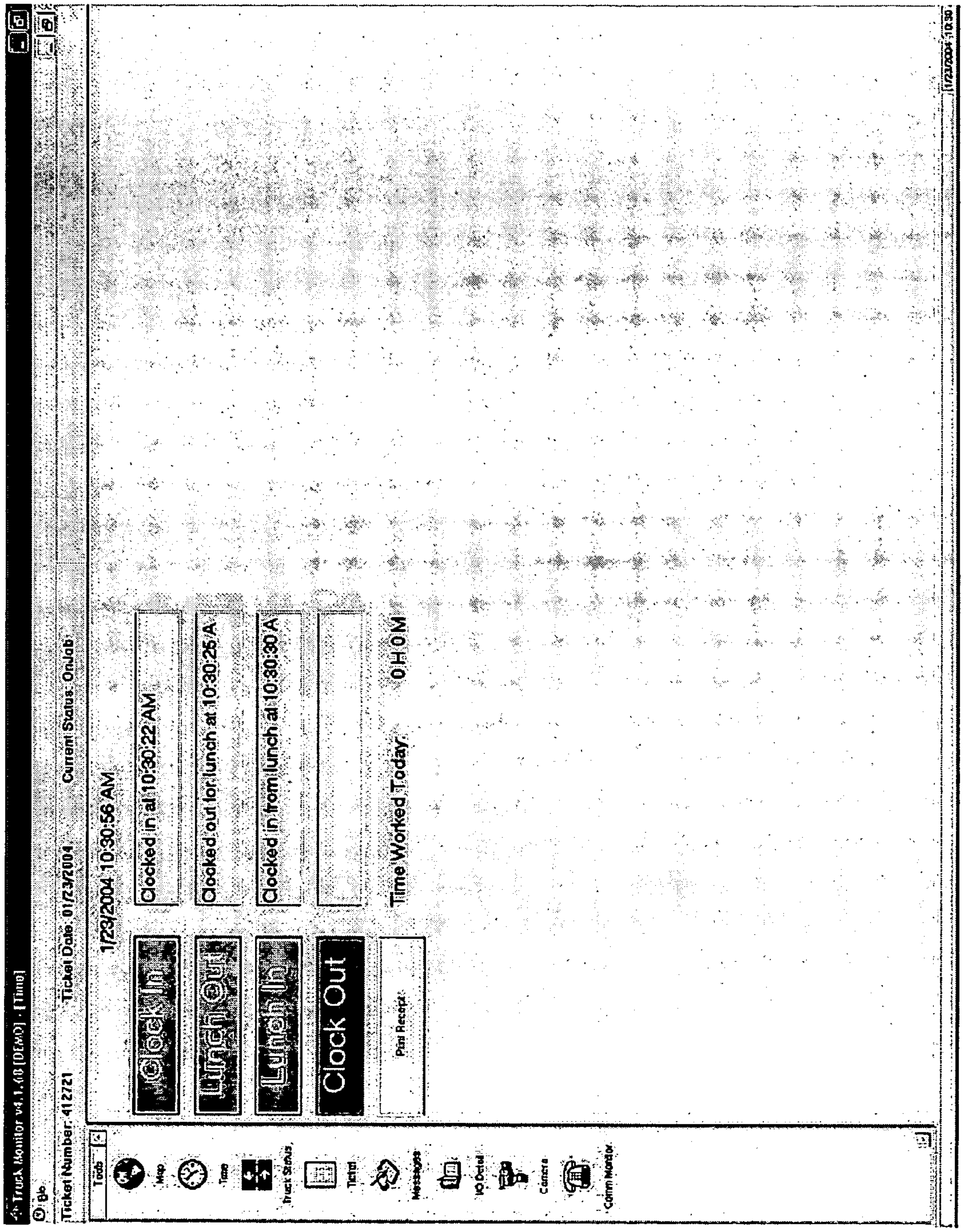
FIG. 20 is a screenshot from a CPU mounted in a truck, illustrating a time clock screen in accordance with principles of the present invention.
Figure 21:
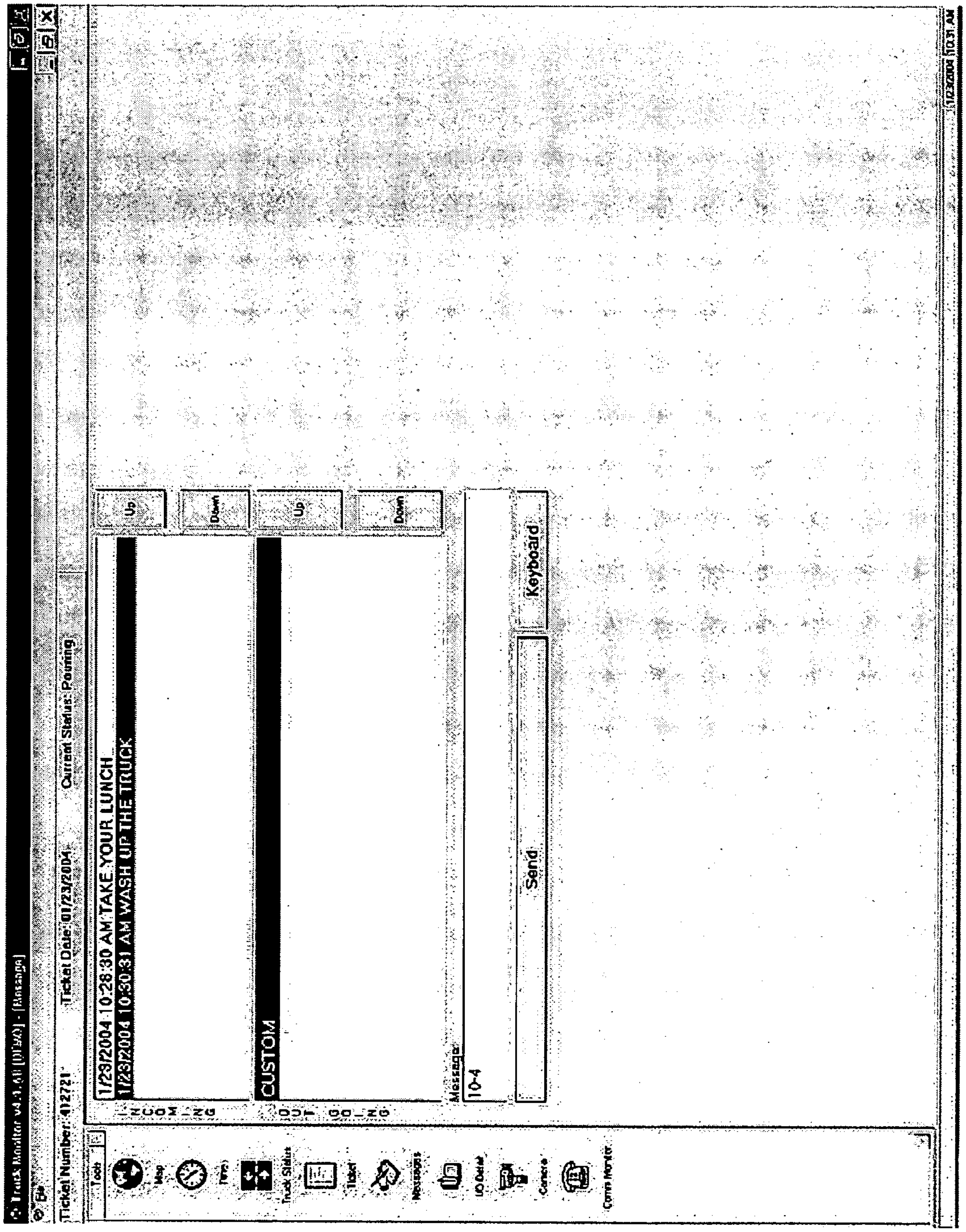
FIG. 21 is a screenshot from a CPU mounted in a truck, illustrating another messages screen in accordance with principles of the present invention.
Figure 22:
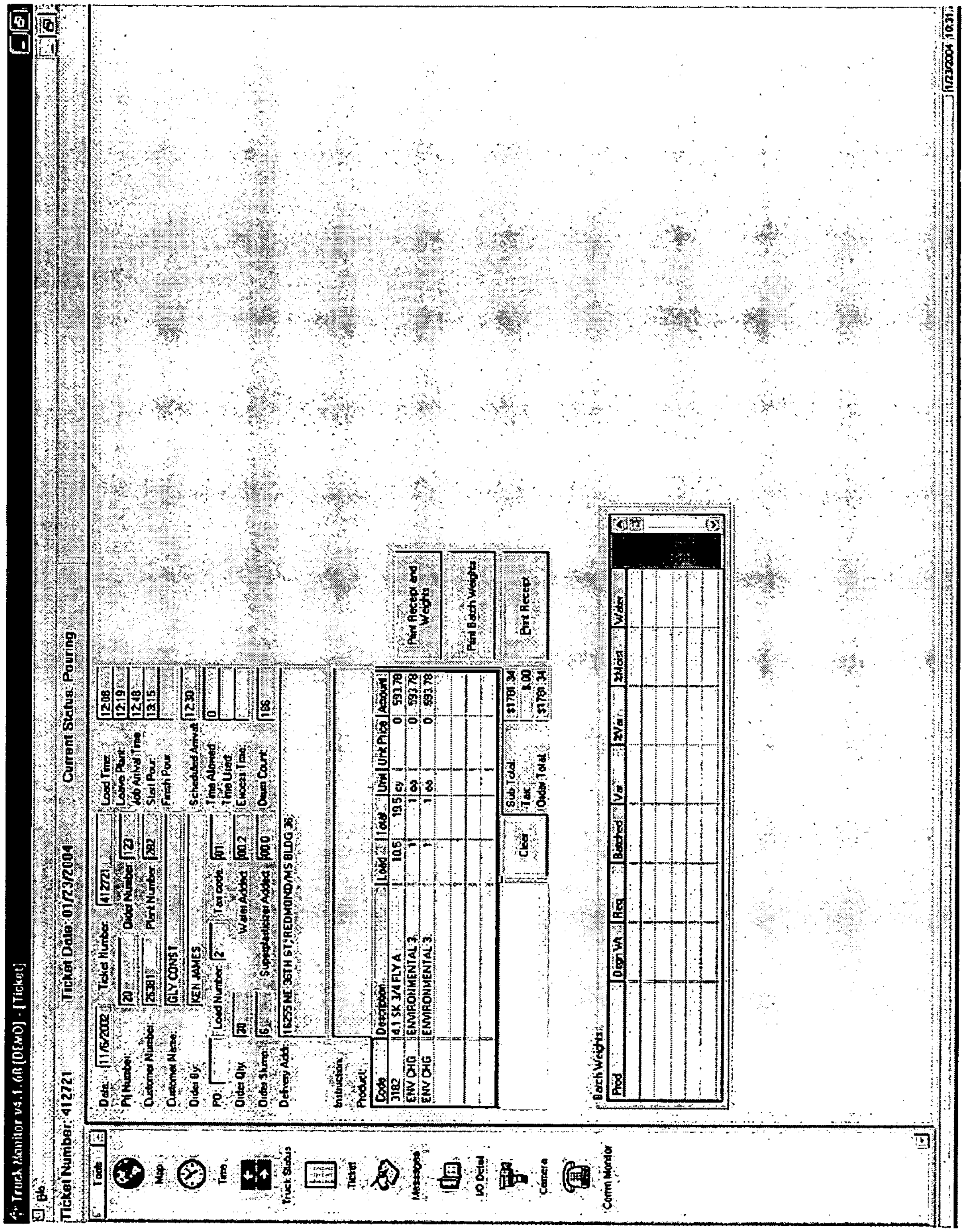
FIG. 22 is a screenshot from a CPU mounted in a truck, illustrating an electronic ticket screen in accordance with principles of the present invention.

FIG. 19 is a screenshot from a CPU mounted in a truck, illustrating a status screen in accordance with principles of the present invention. FIG. 20 is a screenshot from a CPU mounted in a truck, illustrating a time clock screen in accordance with principles of the present invention. FIG. 21 is a screenshot from a CPU mounted in a truck, illustrating another messages screen in accordance with principles of the present invention. FIG. 22 is a screenshot from a CPU mounted in a truck, illustrating an electronic ticket screen in accordance with principles of the present invention.

Figure 23:
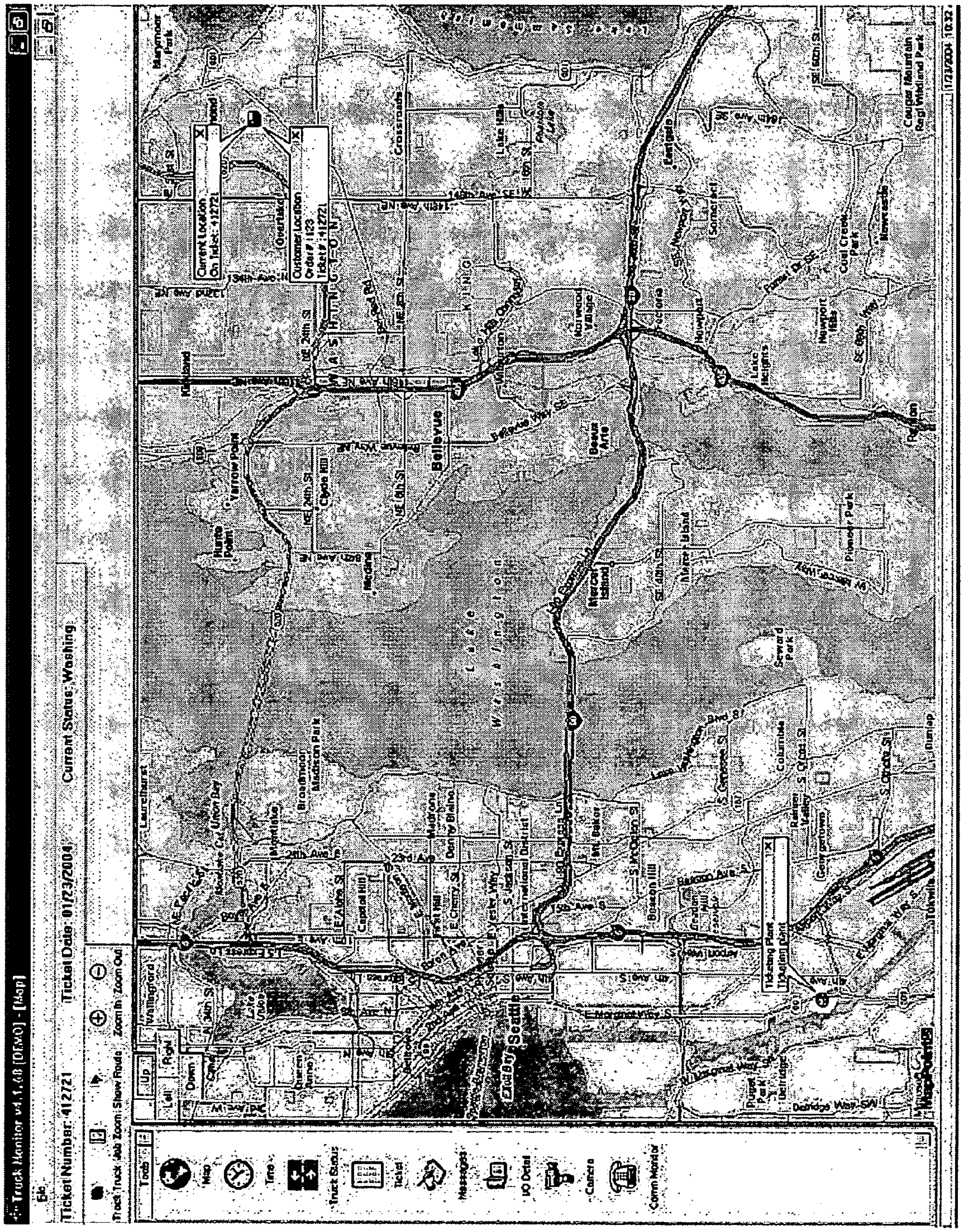
FIG. 23 is a screenshot of a CPU mounted in a truck, illustrating a map screen in accordance with principles of the present invention.
Figure 24:
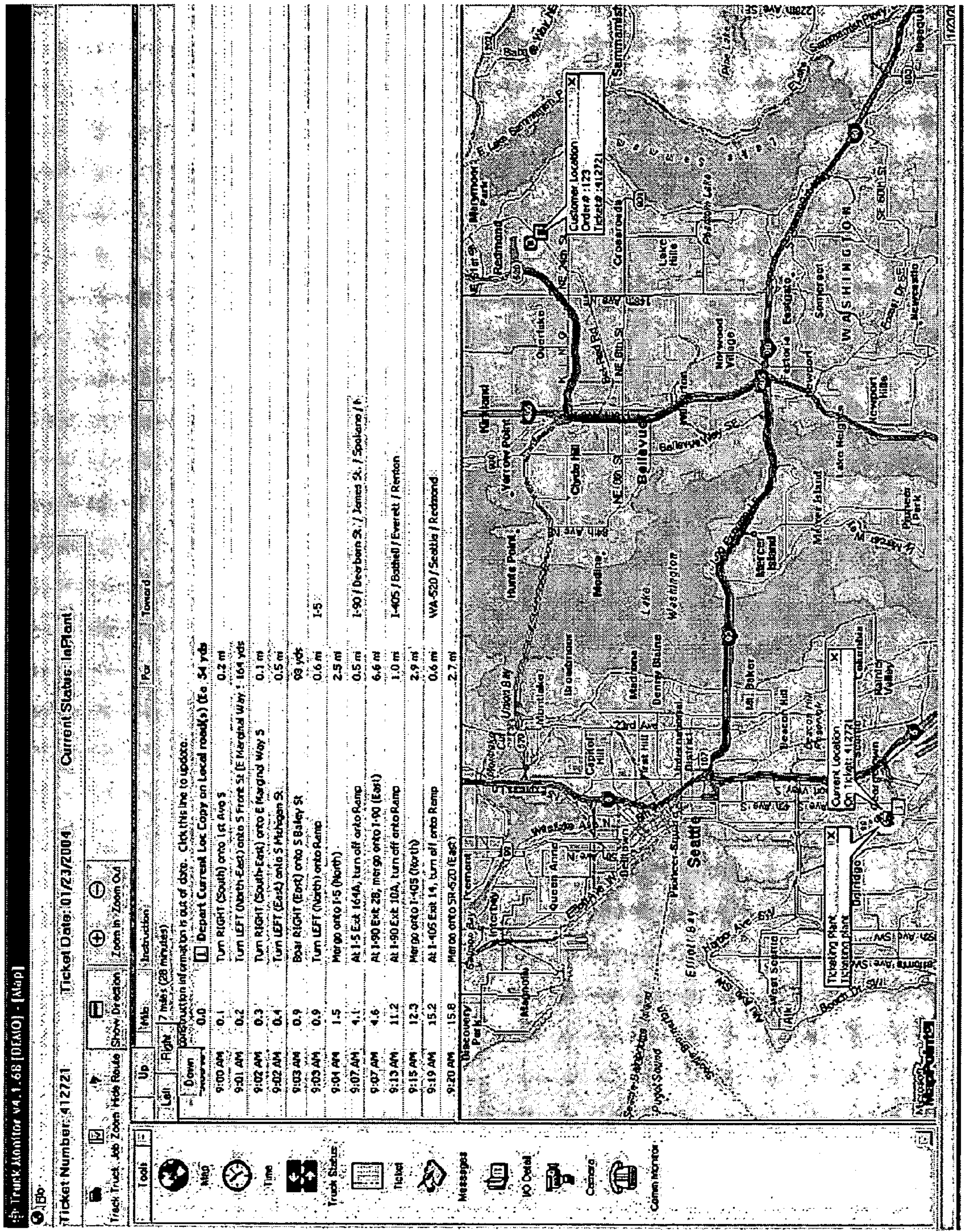
FIG. 24 is a screenshot of a CPU mounted in a truck, illustrating a map screen and step-by-step directions in accordance with principles of the present invention.

FIG. 23 is a screenshot of a CPU mounted in a truck, illustrating a map screen in accordance with principles of the present invention. Note that the map seen by the driver includes pop-up boxes pointing to the current location of the truck, the location of the jobsite, and the location of the batch plant. This screen further identifies the current status of the truck in question. FIG. 24 is a screenshot of a CPU mounted in a truck, illustrating a map screen and step-by-step directions in accordance with principles of the present invention. In this screenshot, the driver has selected the "show direction" button and thus is shown step-by-step driving directions with approximate mileage to assist the driver in reaching the designation.

Dispatch: MapOrder and TruckTracking

Figure 25:
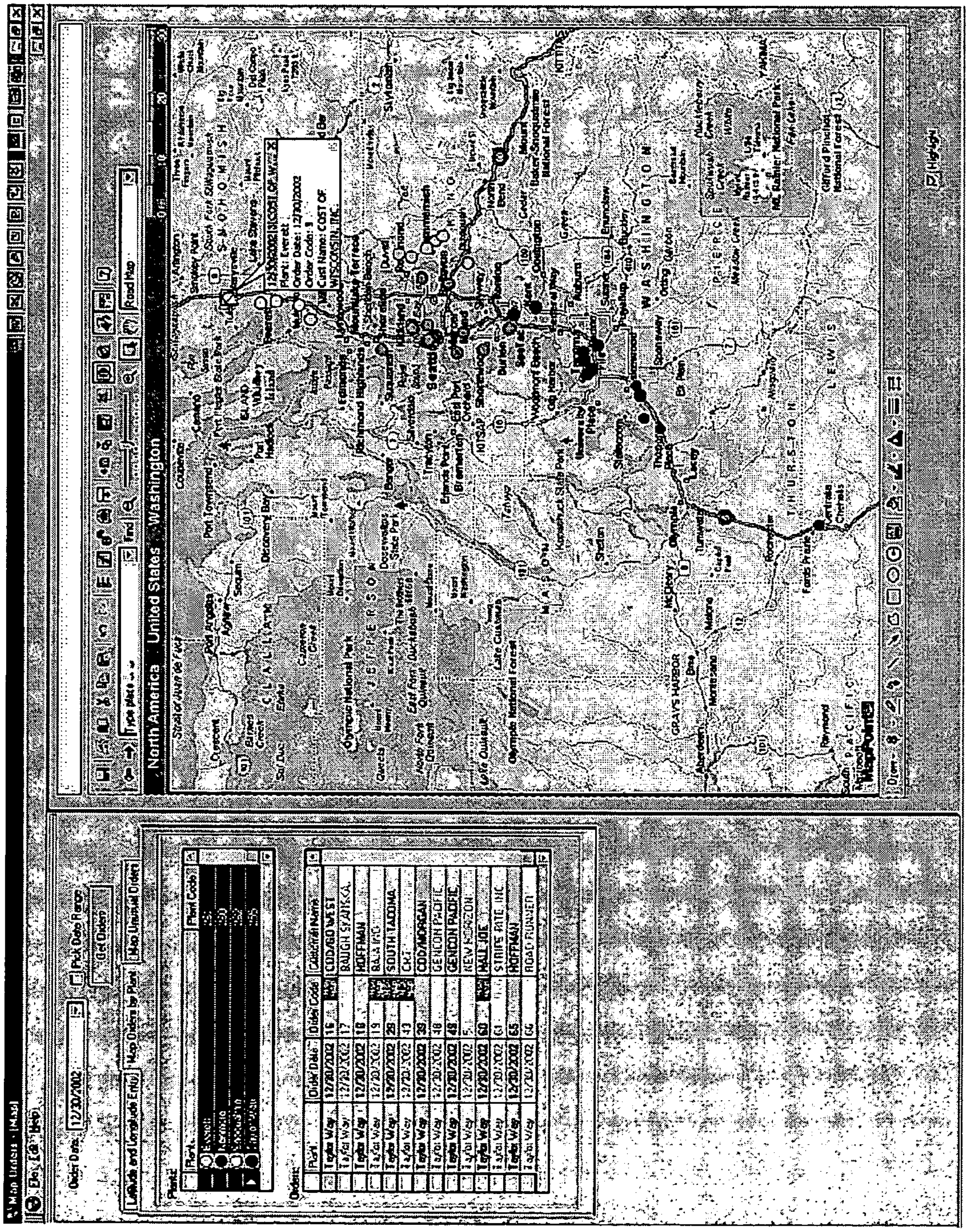
FIG. 25 is a screenshot displayed on a display monitor of the system; the screenshot contains a mapping and listing of orders by plant in accordance with principles of the present invention.

From the dispatch side of the operation, there are two main applications for the dispatch users: MapOrders; order management and mapping, and TruckTracking; real-time truck location/status display. FIG. 25 is a screenshot displayed on a display monitor of the system; the screenshot contains a mapping and listing of orders by plant in accordance with principles of the present invention. On this screen, the plant the orders are assigned to differentiate the various orders represented by colored dots on the map. Each order or dot represents a different concrete order. The dots designating the orders are color coded by plant. Thus, all orders coming out of the same plant will be represented by the same color dot. A legend of plant dot colors is shown to the dispatcher on the upper left side of the screen. As illustrated, if the curser is positioned over a dot, a pop-up will display additional information about that order, for example, the plant, the order date, the order code, quantity ordered, delivery time and the customer name.

Figure 26:
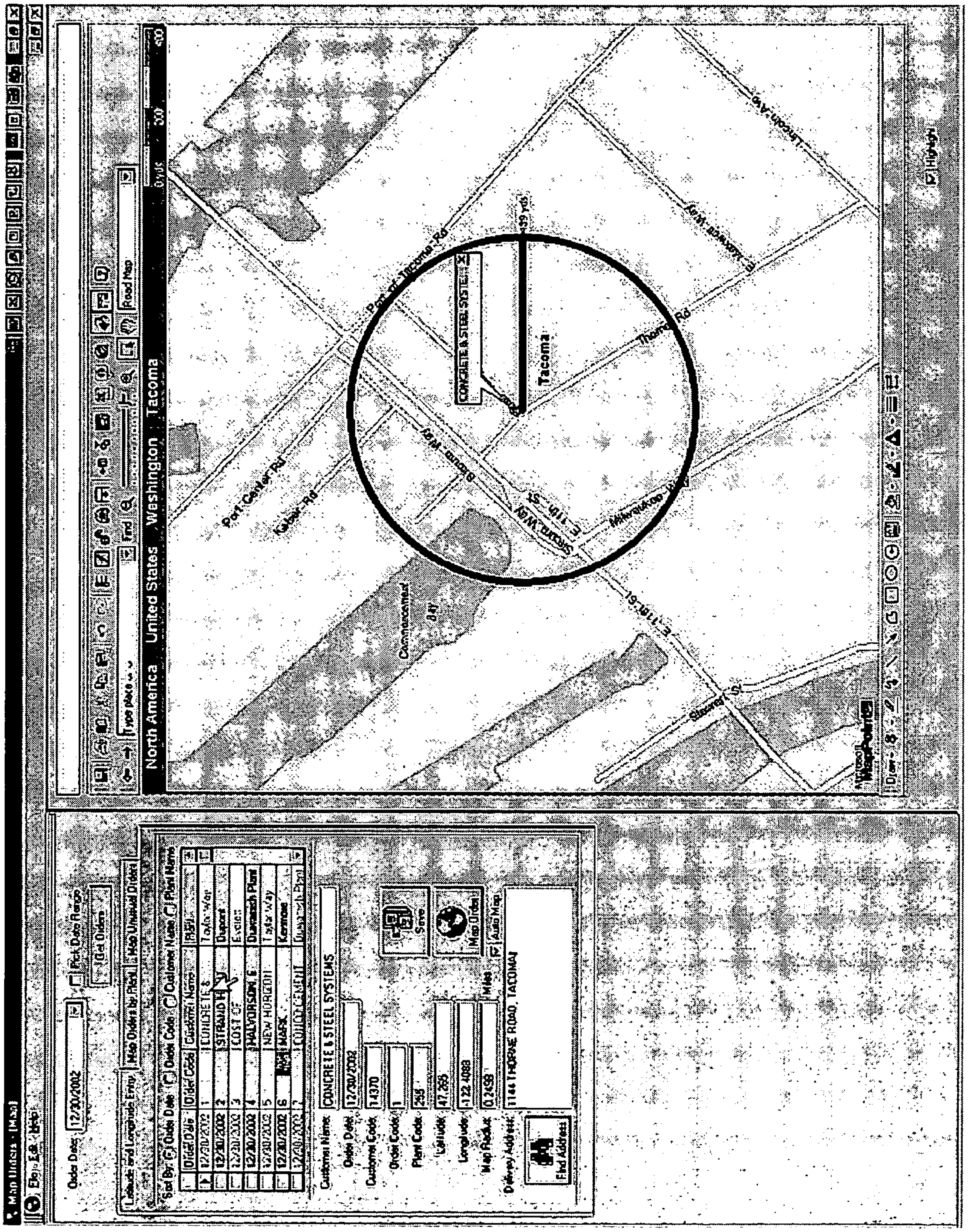
FIG. 26 is a screenshot displayed on a display monitor of the system; the screenshot contains a latitude and longitude mapping of orders in accordance with principles of the present invention.

FIG. 26 is a screenshot displayed on a display monitor of the system; the screenshot contains a latitude and longitude mapping of orders in accordance with principles of the present invention. FIG. 26 illustrates the main screen of MapOrder. On this screen, the dispatcher is able to locate the addresses of the orders and translate the location into longitude and latitude. The dispatcher can then place or adjust the job site radius around the address to provide the "On Job" zone for the trucks. From this screen, the dispatcher can also move the pour location if desired.

Figure 27:
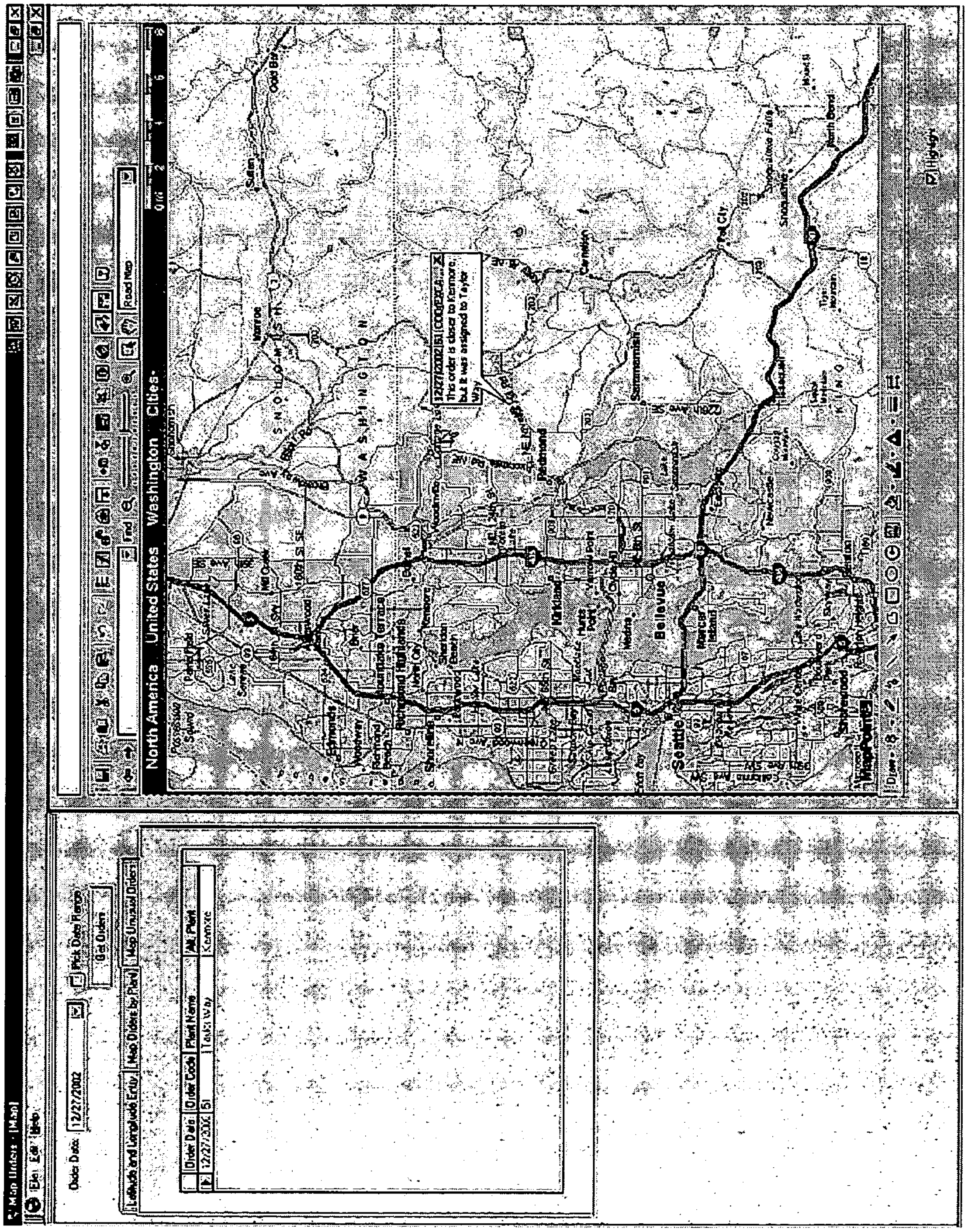
FIG. 27 is a screenshot displayed on a display monitor of the system; the screenshot contains a mapping and listing of unusual orders in accordance with principles of the present invention.

FIG. 27 is a screenshot displayed on a display monitor of the system; the screenshot contains a mapping and listing of unusual orders in accordance with principles of the present invention. The tab for "Map Unusual Orders" showing this screen allows the dispatcher to quickly review any orders that are inefficiently assigned, for example, that are not assigned to the closest plant (as shown in the exemplary screen shot of FIG. 27).

Figure 28:
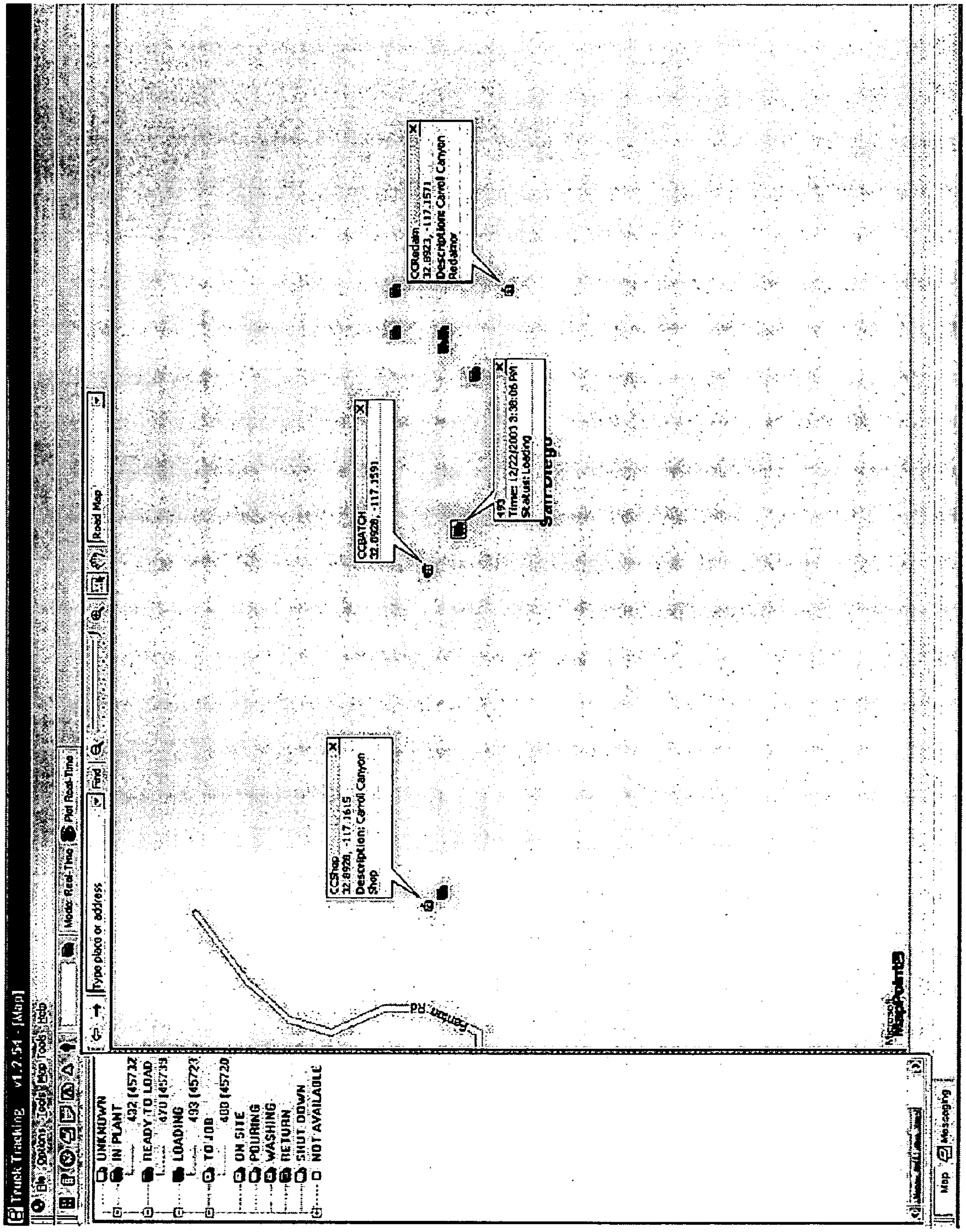
FIG. 28 is a screenshot displayed on a display monitor of the system; the screenshot contains a map tracking the trucks in accordance with principles of the present invention.

FIG. 28 is a screenshot displayed on a display monitor of the system; the screenshot contains a map tracking the trucks in accordance with principles of the present invention. The screenshot of FIG. 28 illustrates the real-time truck status of the trucks for a particular order or from a particular plant. The tree on the left side of the screenshot shows each of the trucks in their appropriate status. The map on the right side of the screenshot shows the real-time position of each vehicle or truck along with user configured points of interest (i.e. batch plants, mechanic shops and the like). The icons representing the trucks are color coded to designate the status of the trucks. The color legend for the status of the trucks is located in the tree on the left side of the screenshot.

Figure 29:
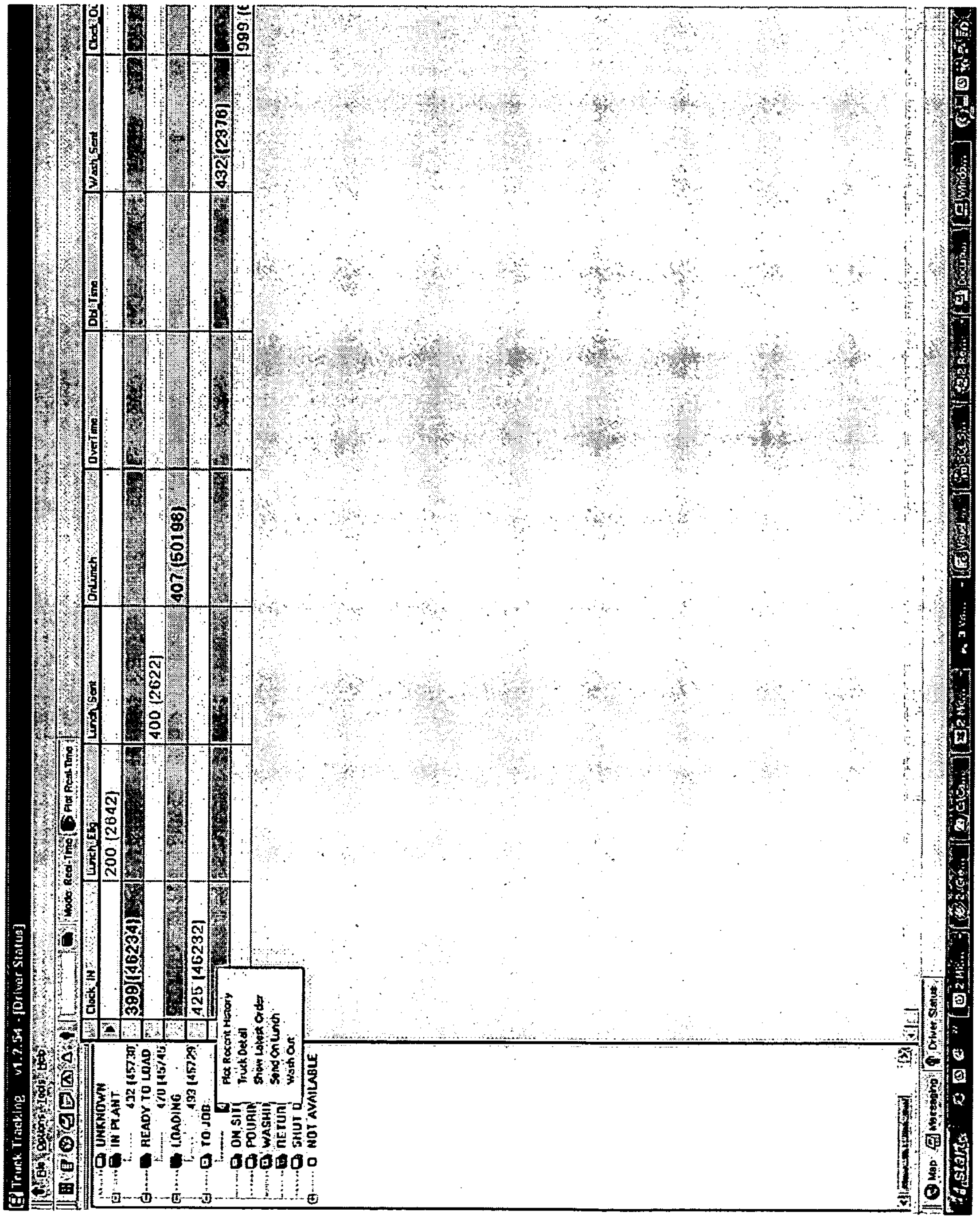
FIG. 29 is a screenshot displayed on a display monitor of the system; the screenshot contains a status of the trucks in accordance with principles of the present invention.

FIG. 29 is a screenshot displayed on a display monitor of the system; the screenshot contains a status of the trucks in accordance with principles of the present invention. The screenshot of FIG. 29 displays a summary of the drivers' status in order to manage the drivers' time. The exemplary summary chart illustrates the following: the drivers that are on the clock; the drivers that are eligible for lunch; the drivers that have been told to take a lunch; and the drivers that are on lunch; the drivers that are on over-time; the drivers that are on double-time; the drivers that have been sent to wash out; and the drivers that have checked out. As in many of these applications, the dispatcher can right click on the truck number to display additional options, which allow the dispatcher to automatically send a message to the driver to go lunch, to go wash out, or the dispatcher can obtain additional information on the driver's order.

Figure 30:
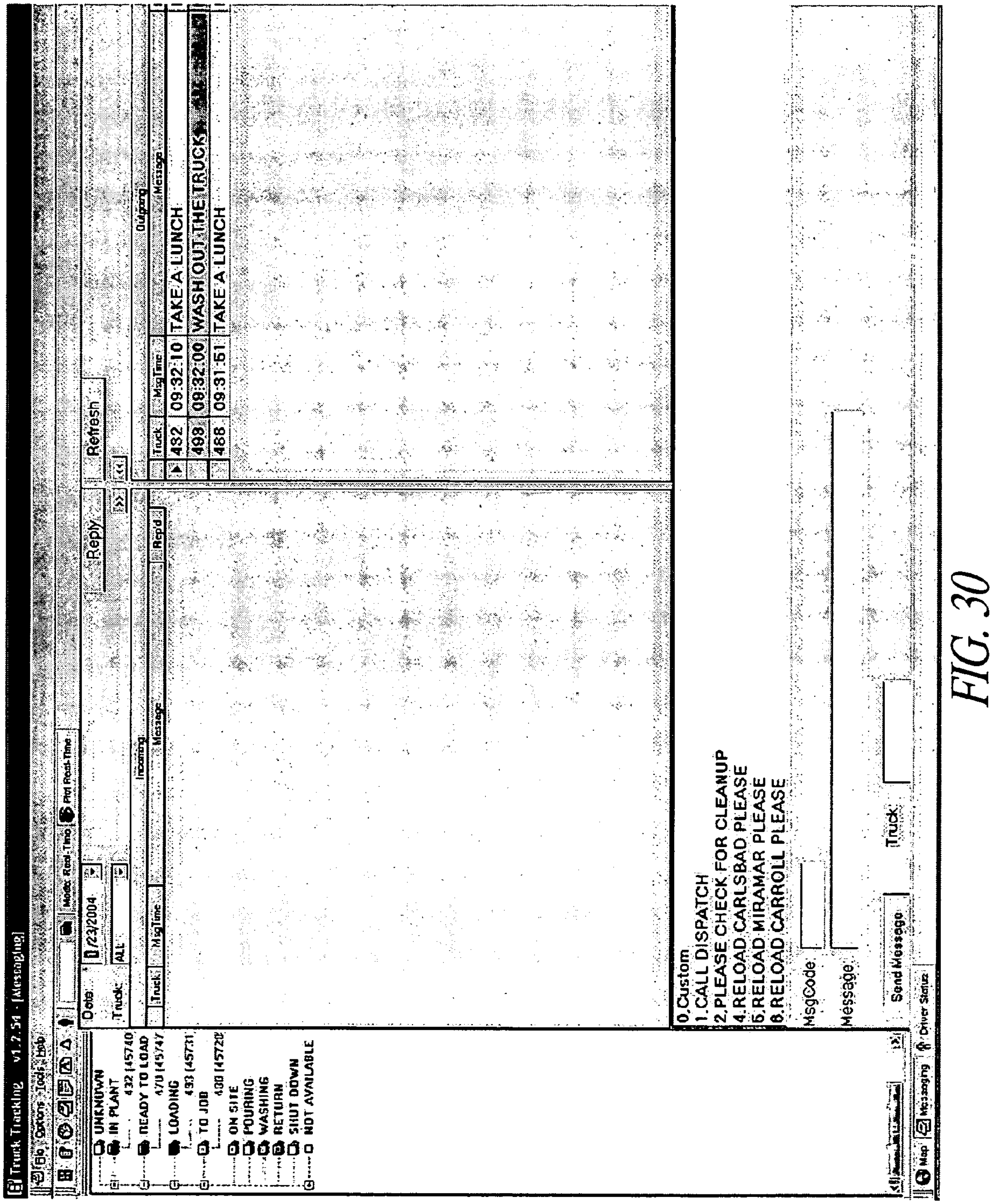
FIG. 30 is a screenshot displayed on a display monitor of the system; the screenshot contains a tracking of the messages to and from the trucks in accordance with principles of the present invention.

FIG. 30 is a screenshot displayed on a display monitor of the system; the screenshot contains a tracking of the messages to and from the trucks in accordance with principles of the present invention. The screenshot of FIG. 30 allows the dispatcher to view all messages sent to or from the trucks, including an acknowledgement of when the message is received by the truck. This screen effectively operates as a two-way messaging screen.

Figure 31:
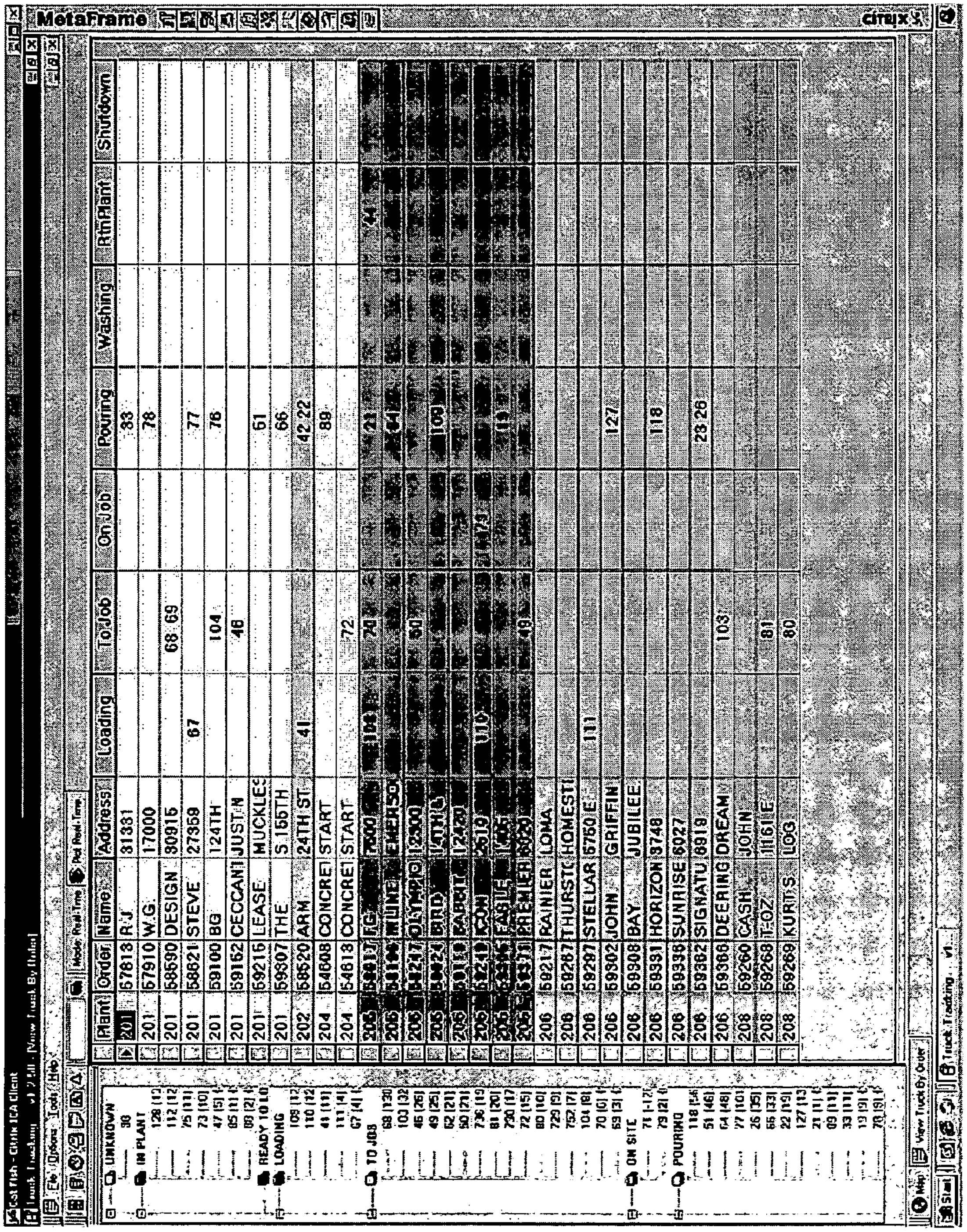
FIG. 31 is a screenshot displayed on a display monitor of the system; the screenshot contains a list of the truck by status in accordance with principles of the present invention.

FIG. 31 is a screenshot displayed on a display monitor of the system; the screenshot contains a list of the trucks by status in accordance with principles of the present invention. This screenshot is an order based truck summary showing all of the truck statuses based on the different orders and plants.

Figure 32:
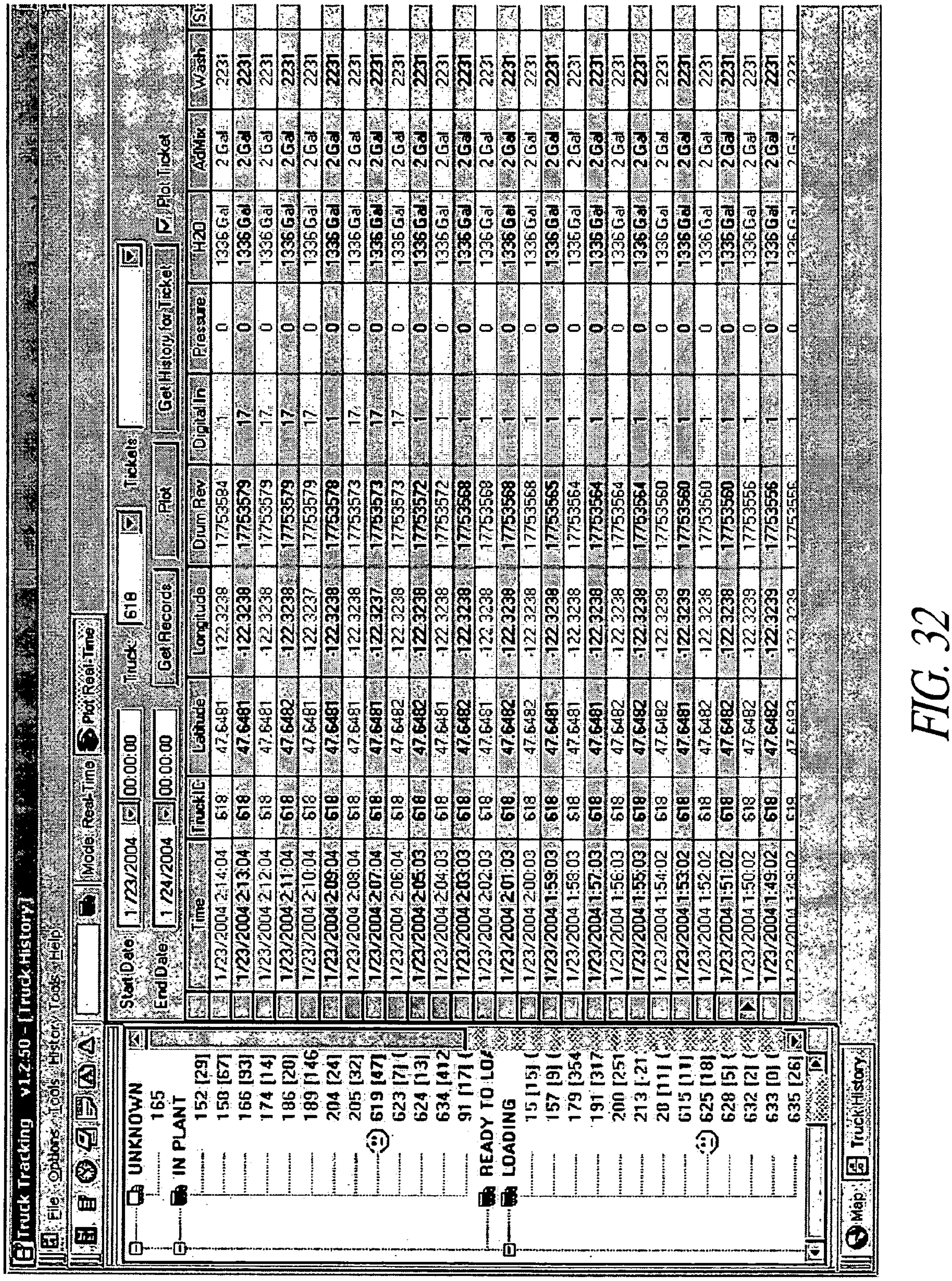
FIG. 32 is a screenshot displayed on a display monitor of the system; the screenshot contains a list of the truck history in accordance with principles of the present invention.

FIG. 32 is a screenshot displayed on a display monitor of the system; the screenshot contains a list of the truck history in accordance with principles of the present invention. This screenshot displays a minute-by minute truck history of all of the sensors presented in a tabular format.

Figure 33:
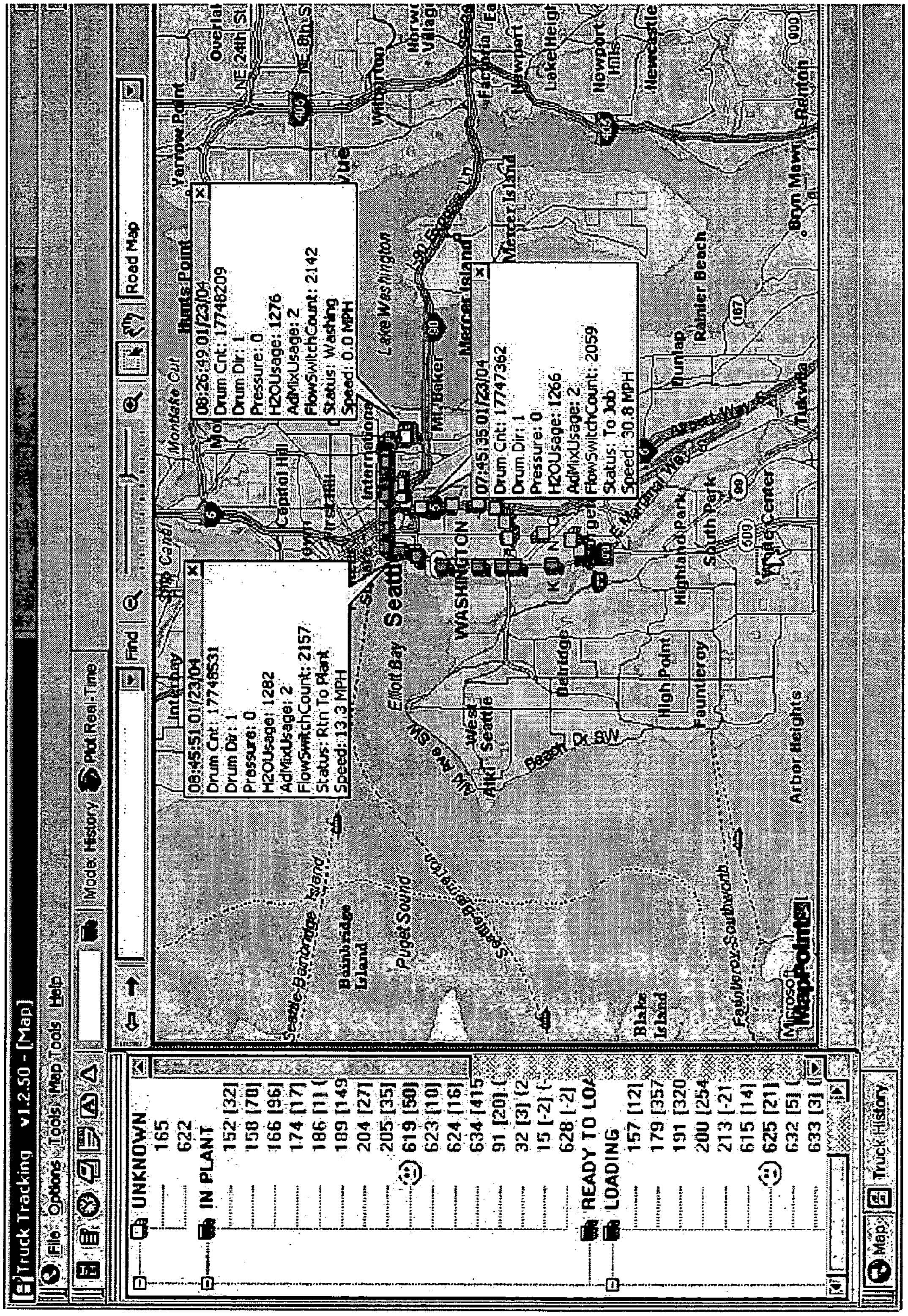
FIG. 33 is a screenshot displayed on a display monitor of the system; the screenshot contains a map of the progress of one or more trucks in accordance with principles of the present invention.

FIG. 33 is a screenshot displayed on a display monitor of the system; the screenshot contains a map of the progress of one or more trucks in accordance with principles of the present invention. This screenshot illustrates minute-by-minute truck history data of all sensors displayed in cookie crumb format; each icon represents one-minute (user-definable to within a second) in this exemplary embodiment. Further, the icons are color coded by status in order to further provide a visual summary of a truck's delivery history to the dispatcher. As in other screens, pop-ups provide additional information about the truck, including readings on all of a truck's sensors.

Figure 34:
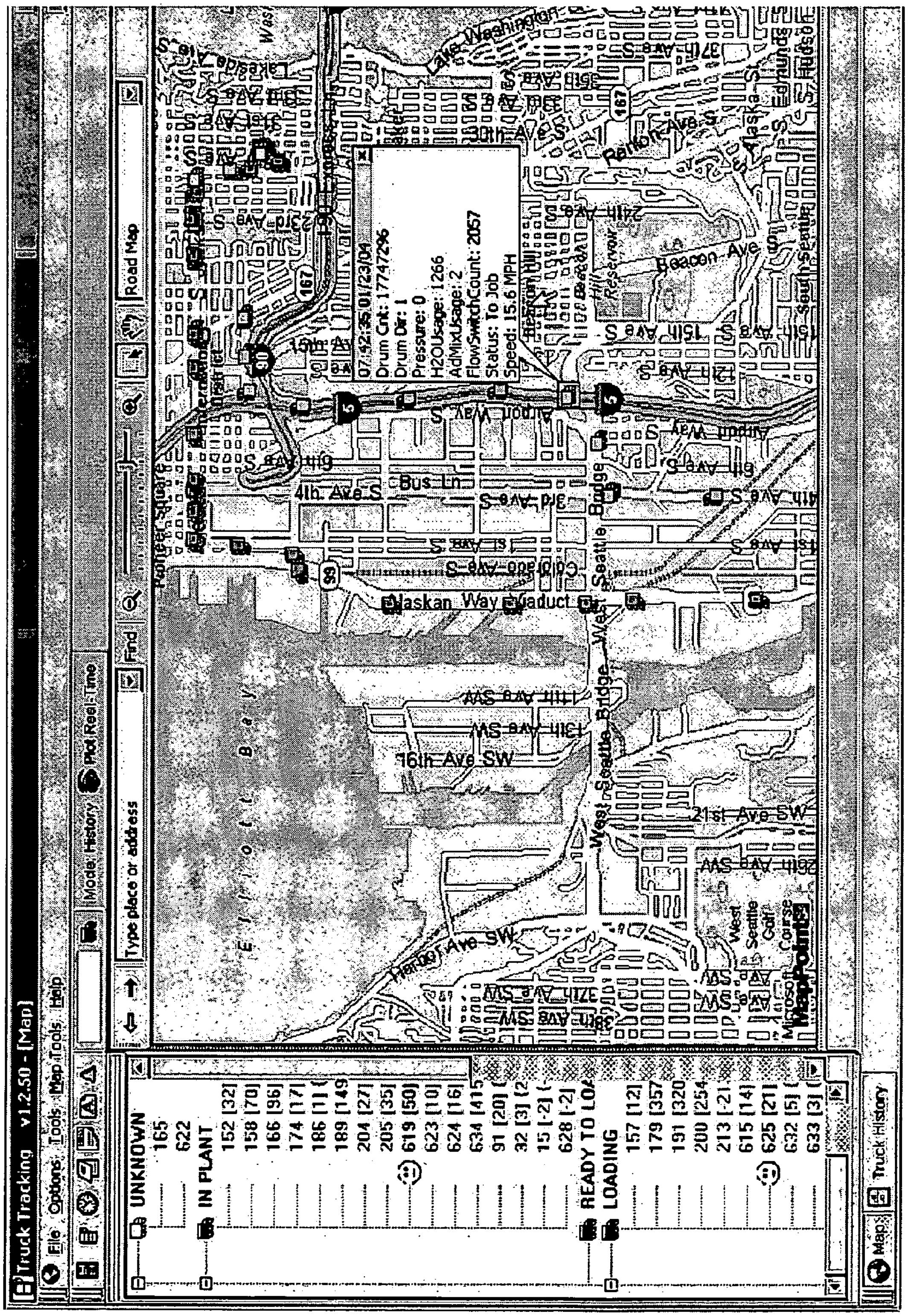
FIG. 34 is a screenshot displayed on a display monitor of the system; the screenshot contains a mapping of one or more trucks in accordance with principles of the present invention.

FIG. 34 is a screenshot displayed on a display monitor of the system; the screenshot contains another map of one or more trucks in accordance with principles of the present invention. This screenshot illustrates minute-by-minute history data of all sensors displayed in bread-crumb format; each icon represents one-minute increments. Again, the icons are color coded by status to further provide a visual summary of a truck's status to the dispatcher. As in other screens, pop-ups provide additional information about the truck, including the current readings on all of a truck's sensors.

Figure 35:
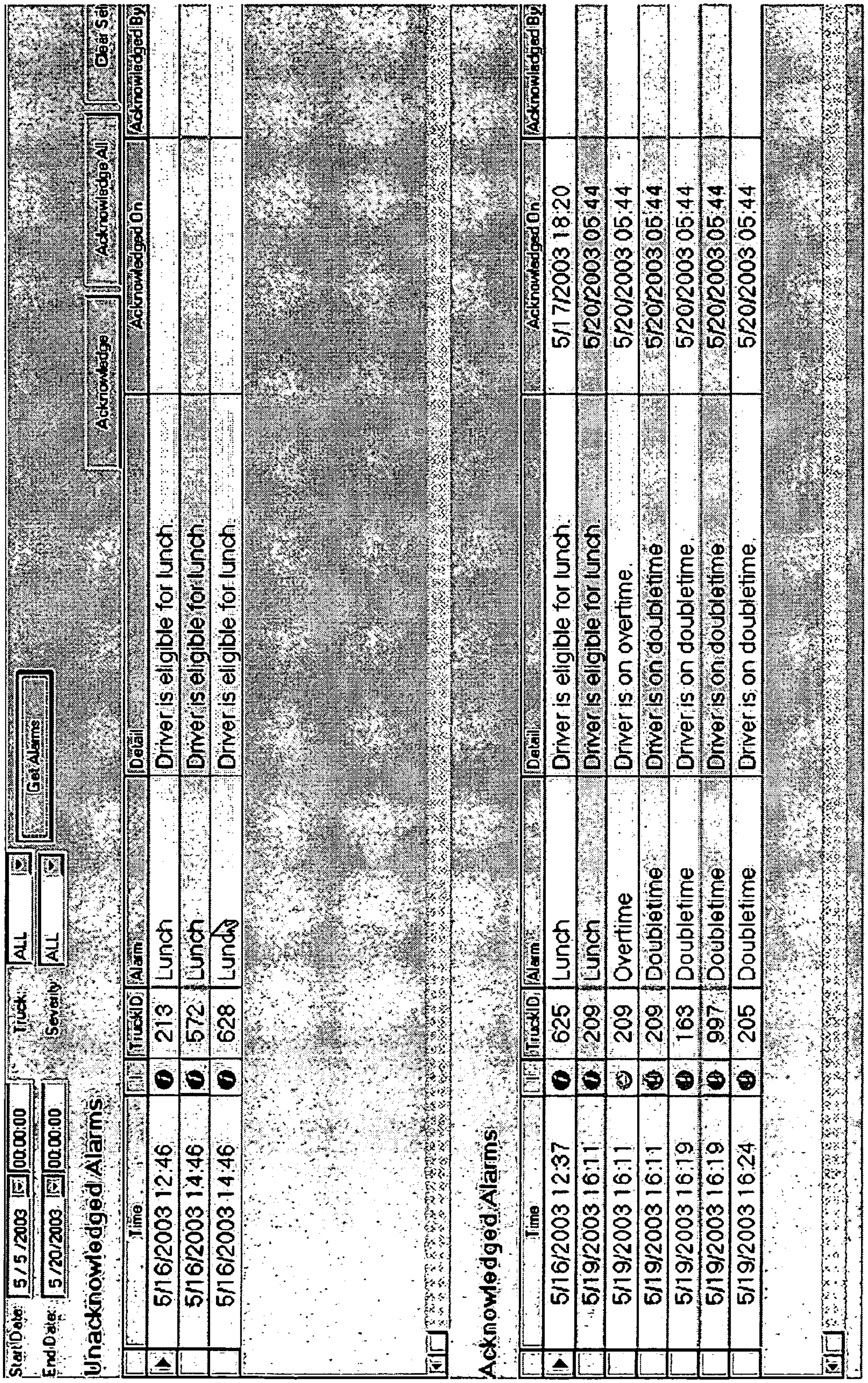
FIG. 35 is a screenshot displayed on a display monitor of the system; the screenshot contains a listing of alarms in accordance with principles of the present invention.

FIG. 35 is a screenshot displayed on a display monitor of the system; the screenshot contains a listing of alarms in accordance with principles of the present invention. This screenshot illustrates customizable real-time alarms generated by using flexible scripts to alert dispatchers to operation anomalies. In the exemplary embodiment, a splitscreen is shown; the top screen contains the unacknowledged alarms and the bottom screen contains the acknowledged alarms.

FIGS. 36A–36C are reports generated from the data recorded in accordance with principles of the present invention. Since the customer controls all data, reports can be generated with numerous commercial report generation tools. Currently, reports are integrated and displayed with Microsoft Excel, however, other programs can easily be used to display the report data. According to one aspect of the invention, the report generation utility is packaged and installed as an Excel add-in.

As shown in FIG. 36A, this exemplary report includes the average cubic yards of concrete hauled by each driver, the total number of trips taken by each driver and the total cubic yards of concrete hauled by the driver. FIG. 36B illustrates a sample report showing the average delivery time for each customer. FIG. 36C illustrates an interactive report showing the amount of time each truck spent in different "hot spots," namely, the shop, in reclaim, call boxes, and the like. These three reports are but a few of the numerous custom and standard reports that can be created in accordance with the data collected in accordance with this system.

Operational Advantages

The position of each truck is tracked to determine the most efficient use of the truck as a resource to determine which job the truck should serve depending on a variety of factors including the proximity to the jobsite, the proximity to a given batch plant and the need at the given time that the truck is available. Thus, trucks can be rerouted in real time in order to provide maximum efficiency of the resource. For example, if a batch plant has a mechanical failure, trucks can be rerouted in real time to access another batch plant. Alternatively, if a particular pour on a jobsite is complete or is stopped for any reason, trucks that were designated for that job can be rerouted to another job. Alternatively, if a jobsite requires additional trucks once the pour is underway, that need can be addressed by reviewing the availability (status) and location of the entire fleet of trucks; in real time and on one dispatcher screen.

In accordance with principles of the invention outlined herein, a "balancing" of the resources is performed, and additionally can be manually adjusted depending on the changing needs of the jobs, the availabilities of batch plant and the drivers. Thus, the dispatcher has enough knowledge of the resources in order to efficiently manage and balance their resources in real-time.

According to aspects of the present system, status reporting, billing-data collection, and electronic time cards allow drivers to go directly to their vehicles and clock in and out of work without handling any paperwork. Other advantages of the present invention include: increased productivity; decreased driver overtime expenditures; increased concrete delivery per hour; automatic DOT log reporting compliance.

Vehicle operating data, for example, speed, engine rpm and drum revolution, enable an implementation of a data-specific evaluative management system for drivers. Data on sudden vehicle stops and starts and deviation from optimal engine conditions (1,500 rpm) is culled and reviewed. Drivers may be ranked on a scale reflecting vehicle care and safe operating practice, with the best performers enjoying quarterly bonuses.

In addition to ready-mix concrete delivery, other delivery industries and systems can benefit from the invention disclosed herein. For example, long haul trucks, waste management, sand and gravel delivery, and commercial or residential moving companies are just a few of the systems that would benefit from the management, real-time tracking and resource allocation of the present invention. In addition to a widely available operating platform, most of the hardware described herein can be purchased off the shelf such that users can purchase it in local markets, and have their own mechanics install. According to another aspect of the present invention, the system is not only compatible with Windows-based dispatch and production software, but the system is intended to run on a user's server versus a hosted network. This is a significant advantage over many of the other systems that require a hosted network in order to control the data flow.

Additional key functions according to various embodiments of the present invention include:

Capabilities

Users can make spontaneous decisions with the graphical display of real-timed information on current delivery status increasing fleet efficiencies. The system allows management of exceptions as they occur: driver overtime, driver lunch window, and end-of-day wash-out times.

Order Mapping

The software integrates with database or file-based order systems. It offers automated address search and automatically maps memorized delivery sites. It maps order distribution across all plants and flags irregularities to facilitate better plant sourcing.

The software graphically displays order by time, order quantity, price and quality control demand. Using the quality control demand display, quality control personnel can be dispatched more efficiently.

The software graphically displays market migration over time.

Real-time Truck Tracking

The software collects information on vehicle location, direction, speed, and current sensor readings for each truck. Using different colored icons, users can view their entire fleet at a glance and note the status of individual trucks. Minute by minute sensor readings are captured on the map in text.

Payroll Solution

The electronic timecard function permits viewing of which trucks are on overtime. Timecard data, along with all other vehicle data, are integrated with central business systems. The timecard feature can also be adapted to other mobile employees such as sales and quality control personnel.

Safety

Backup camera integration for added safety; streaming safety and training video right into the cab; provide historical data for accident review; alert drivers to potential truck breakdowns, for example, a ruptured hydraulic line.

Additional Capabilities

The system displays full-colored navigation map, and directions; driver management tools for identifying exceptional as well as poor drivers; electronic tickets reducing billing cycle, increasing accuracy, and reducing overhead; electronic billing reducing collection cycle, increasing accuracy, and reducing overhead; offer customer limited access to real-time job information to monitor their efficiencies; self-sufficient truck processing unit allows it to complete transaction without additional communication with server once left plant; system allows for redirecting loaded trucks to a different job site without returning to plant for new ticket; custom scripts allow remote updating of status calculation logic; data collection frequency is adjustable to with-in once per second; provide finishing sub-contractor billing services; provide online quotation and ordering system based upon demand; field technical data entry on mix performance and compliance to mix specifications; historical demand analysis allows optimization of fleet size.

System Overview:

Autostatus Truck Computer and Onboard Sensors

According to one embodiment of the present invention, a computer is installed in the truck. By putting an actual computer onboard and not just a simple data unit, the system operates at a higher level of efficiency. Connected to the dispatcher via wireless network and tied into the vehicle-mounted sensors, the Autostatus Truck Computer delivers real-time information for instant response, and captures data for future decisions. It is more versatile, it has more longevity and it will deliver a higher return on investment.

Superior Capabilities.

The present invention delivers vital real-time status information—from loading to washout—without driver intervention. This includes GPS vehicle position, time and all sensor data. According to aspects of the present invention, the system also generates automated job site updates: if mapped incorrectly, it will correct automatically. If the truck is pouring sidewalks or curbs and gutter, and thus is moving during delivery, it will continuously update the exact pour location. Self-sufficient truck processing unit allows it to complete the transaction without additional communication with the server once the truck has left the plant.

Microsoft® Windows XP™ Embedded System.

One of the aspects of the present invention is the onboard computer mounted in the truck for use with the present invention. An advantage of this system is that instead of replacing units as they become obsolete, the user can simply update software. Additionally, the user can easily connect—without custom hardware modifications—generic PC peripherals such as thermal printers, Web cameras, and signature capture pads, mag card readers, etc. According to one embodiment of the present invention, the onboard truck computer has 8 digital inputs, 1 digital output and 3 analog inputs, in other embodiments, additional input and output devices are included. According to one embodiment of the invention, the hard drive has a full 15 GB of data buffering, the equivalent of 10 years of truck data.

High-Speed Connection.

The high-speed connection can be any one of the following: CDPD, iDEN, 1XRT, GPRS, or radio for communication. With the optional WiFi 802.11b network, the Autostatus Truck Computer can be part of the users corporate WAN and enable remote IT administration for centralized software updates, system maintenance and so on.

Vehicle-Mounted Sensors.

According to one embodiment of the present invention, standard sensors include a GPS receiver, drum rotation speed and direction, water flow to drum, admixture flow to drum and wash water flow indicator. With the expansion capabilities of 2 digital and 3 analog inputs, more can be added; simply run the wire and plug it in. In an alternative embodiment, a sensor is installed on the hydraulic hose line so that if it ruptures or loses hydraulic pressure, the system would automatically send an error message to the shop with GPS coordinates, and even prompt the driver to pull over.

FIG. 39 illustrated one exemplary layout for the GPS box and the sensor connections. The box has several inputs and outputs to allow it to sense and record data from numerous truck functions simultaneously. As shown in FIG. 39, a phone antenna interface 3905 is provided; a GPS antenna interface is provided 3910 in addition to numerous sensor interfaces for input/output. In the exemplary embodiment, the sensors include: add mix meter; water meter; wash up switch; drum rotation sensor; power and ignition. Alternative sensors such as: Seat switch; load cell; hydraulic pressure transducer; bar code reader; door sensor; engine diagnostic connection; engine ignition sensor; biometric sensors (finger print, retina scan), and the like.

FIGS. 40A and 40B are schematic illustrations of the sensor positions on the drum 4010 of a concrete truck in accordance with principles of the present invention. Drum rotation sensors 4030 detect the speed and direction of the turning drum. In the exemplary embodiment, the drum rotation sensor 4030 is mounted on a bracket, and the sensor head points toward the end drum. The mating cable (not shown) is connected to the sensor and then run into the cab where the truck monitor box is mounted. Further in accordance with the exemplary embodiment, four magnets 4020 are mounted and evenly spaced around the end of the drum with South Pole of the magnet facing out. The magnets 4020 should be positioned to directly pass over the sensor 4030. The distance W between the magnets and sensor is approximately 1½ inches or less for the largest magnets and ⅝ inches or less for smaller magnets. In one exemplary embodiment, the magnets are placed adjacent to the bolts 4040 on the drum.

FIG. 41 is a photograph of a flow switch sensor positioned on a truck in accordance with principles of the present invention. As illustrated in FIG. 41, a flow switch sensor 4100 is positioned in-line with the wash-down hose to detect the ON/OFF state of the wash-down hose. According to the exemplary embodiment, signal cables are run into the cab where the truck monitor box is mounted.

FIG. 42 is a photograph of a GPS antenna mounted on a truck in accordance with principles of the present invention. The GPS antenna 4210 provides a signal to the truck monitor box so that the box can receive GPS data. In the exemplary embodiment the GPS antenna is mounted on the top of the cab where it has an unobstructed view of the sky to improve the received signal strength. A signal cable is run into the cab to the truck monitor box.

Autostatus Truck Computer and Onboard Sensors

A system designed for flexibility so it can be easily integrated into an existing infrastructure.

| Exemplary CPU Specification | |
|---|---|
| Dimensions | 4.4" H × 13.4" L × 10.6" W |
| Sensors | 3 analog inputs, 8 digital inputs and 1 digital output for vehicle mounted sensors |
| Wireless Communications | Choice of UHF, VHF CDPD, GPRS, 1XRT, and IDEN networks |
| GPS Accuracy | CPS Position: 6 m (50%), 9 m (90%) Velocity: 0.06 m/sec |

-continued

| Exemplary CPU Specification | |
|---|---|
| GPS Acquisition | Cold Start: 130 seconds (90%) Warm Start: 45 seconds (90%) Hot Start: 20 seconds (90%) |
| Operating System | Microsoft Windows XP Embedded |
| CPU | P-III class 667 MHz |
| DRAM | One 144 SODIMM socket supports memory up to 512 MB PC133 SDRAM |
| Serial/USB Ports | RS-232/422/485 and USB ports for peripherals such as printer, signature capture pad, and magnetic card reader |
| Compact Flash I/II socket | CF-2 socket for IDE Flash Disk |
| LVDS Video Display | 800 × 600 LVDS (2 × 18 bit) LCD |
| Enhanced IDE Interface | One channel supports up to two EIDE devices |
| Ethernet Interface | IEEE 802.3 u 100BASE-T Ethernet compatible and IEEE 802.11b Wireless Ethernet compatible |
| Power Requirements | Max: 4.5 A @ + 5 VDC, .1.3 A @ + 12 VDC Automatic ON/OFF via ignition switch |

| Exemplary PDA Specification | |
|---|---|
| Dimensions | 5.43" L × 3.3" W × 0.63" D |
| Sensors | 3 analog inputs, 8 digital inputs and 1 digital output for vehicle mounted sensors |
| Wireless Cellular Communications | Choice of UHF, VHF CDPD, GPRS, 1XRT, and IDEN networks |
| GPS Accuracy | CPS Position: 6 m (50%), 9 m (90%) Velocity: 0.06 m/sec |
| GPS Acquisition | Cold Start: 130 seconds (90%) Warm Start: 45 seconds (90%) Hot Start: 20 seconds (90%) |
| Operating System | Microsoft ® Windows ® Mobile ™ 2003 Software for Pocket PC |
| CPU | Intel ® 400 MHz processor with Xscale ™ technology |
| Memory | 128 MB SDRAM, 48 MB Flash ROM |
| Display | Transflective TFT LCD, over 65 K colors 16-bit, 240 × 320 resolution, 3.8" diagonal viewable image size |
| Wireless Interface | Integrated Bluetooth ® wireless technology, WLAN 802.11b |

Autostatus Software

Designed expressly for the ready mix industry, the real-time truck tracking and status-mapping software of the present system is useable in the field and customizable as needed. The truck monitoring software includes real-time status calculation, messaging, data buffering, and an intuitive graphical user interface. The data collection frequency is adjustable up to once per second.

Capabilities.

By graphically displaying real-time information on current delivery status, the present invention provides valuable information to allow the user to make intelligent decisions. Data can be reviewed instantly or analyzed at a later date; thereby providing the information needed to make improvements on the spot or in subsequent loads. Since the onboard device is an actual PC using Microsoft® Windows XP™, it integrates seamlessly with central business systems such as accounting, payroll and customer relationship management (CRM).

Order Mapping.

The present system is easily integrated with any database or file based order system. The software of the present invention offers automated address search and automatically maps memorized delivery sites. A user can drag and drop job locations to any point on the map and customize job sites. The system maps order distribution across all plants and flags irregularities. No longer will a dispatcher send a load from the wrong plant.

Real-Time Truck Tracking.

The present invention delivers information in real time. According to aspects of the present invention, the system has the capability of illustrating the real-time location, direction, speed, and current sensor readings for each truck. Using different colored icons, a dispatcher can view the entire fleet in a single glance and instantly note individual truck status (in plant, loading, to job, on job site, pouring, washout and return to plant). The dispatcher can also selectively map trucks by status, batching plant, truck number and order number. The system even captures minute-by-minute route and sensor history in both text and maps; data collection frequency is adjustable up to once per second.

Electronic Timecards.

A powerful benefit of this function is the ability to see graphically which trucks are on overtime at any given moment. In addition, the electronic timecard enables an integrated payroll solution that will save accounting hours and will minimize or eliminate mishandling errors caused by paper timecards.

Additional Advantages

Additional advantages according to aspects of the current invention include: preconfigured data servers, firewalls and IT services. All data is stored on the end users site for data mining, custom reporting, etc. There is even an optional remote data hosting service. The system is eminently customizable, allowing event alarming such as overtime and lunch notification, and event notification such as "at shop," "washout" and so on.

Improved System.

The current invention reduces overtime, avoids client disputes, improves driver productivity and makes dispatching more efficient. Digitizing this part of the operation can also streamline business systems throughout an organization, saving time and money.

Exemplary Specifications

Order Mapping:

- Integrates seamlessly with dispatch software
- View orders by plant, date, customer name and order code
- Zoom from street level to regional view
- Assign job location by address, intersection or latitude/longitude
- Save mapped addresses for auto-mapping of orders
- User selectable job site zones
- Include map zones for custom truck status such as shop, washout, etc.
- Map order distribution across all plants and flags irregularities to facilitate better plant sourcing Real-Time Truck Tracking

- View truck location and status in real-time
- Color coded truck icons for quick status visualization
- Sort trucks by status, order, and plant
- Automatically flag trucks on overtime or needing lunch break
- Recall and map truck route by time or job
- Custom and fixed messaging to vehicles Mobile Software

- Automatic status determination
- In-vehicle route mapping and directions
- Electronic timecard option
- Custom and fixed messaging to dispatch
- Paperless ticketing
- Job site signature capture, card scanning, and printed receipts Autostatus Driver Display As further illustrated with respect to the figures contained herein, the Autostatus Driver Display device includes a graphics card, a screen, finely detailed navigation maps and paperless tickets with optional signature capture.

Touch-Screen Display

According to one aspect of the current invention, a high-definition color LCD panel measures a full 10.4" and has an intuitive touch-screen interface that is easy for any driver to use. It displays two-way text messaging and automated directions (text or spoken). Driver alarms and reminders are customized, such as "Collect payment!" or "Happy birthday!" and "Congratulations! Today you've worked for us 5 years without a lost time accident."

According to an alternative embodiment of the present invention, training and safety videos can be streamed over the WiFi network onto the Autostatus Driver Display.

Detailed Navigation Maps.

With robust, easy-to-read graphics, drivers can pinpoint job locations, select the best route to the site and choose alternate routes to bypass congestion. The maps provide significant detail and allow the driver to pan and zoom into street level. In alternative embodiments, audible prompts are available for directions.

Paperless Tickets

The on-board truck computer can impart all the information needed to complete the transaction, and can even calculate waiting time charges. For cash on deliver (COD) jobs, the display will prompt the driver to collect payment. According to one aspect of the invention, a signature capture capability is added, thus eliminating errors and avoiding client disputes. Delivery and standby charges are automatically calculated and printed on the ticket receipt. Charges for any additives that have been added on-site are also calculated and automatically included in the electronic ticket. Furthermore, since signed tickets may be obtained electronically without scanning, the billing cycle will be cut from days to hours. In the exemplary embodiment, the driver prints a receipt, and the ticket detail is downloaded to billing directly from the tracking system server.

Autostatus Driver Display

Advantages: enhances efficiency, cuts down on paperwork, reduces errors and improves communication with the truck drivers.

Exemplary Specifications

Graphic LCD Option

- 10.4" TFT LCD
- SVGA 800×600 resolution
- Integrated touch screen
- High contrast ratio, high brightness
- Low power consumption
- Intuitive user interface

- Capable of displaying high resolution maps, streaming video, webcams
- Panavise mount for flexible positioning Text LCD Option

- 2 line×20 character backlit LCD display
- 0.22" H×0.13" W character size
- Two-way text messaging
- Full numeric keypad
- User-Defined function keys and indicator lights
- Dash mountable
- 9.5" L×4.0" H×1.75" D housing Alternative PDA System Overview:

FIG. 37 illustrates a communication system design incorporating the communication components of the exemplary embodiment described below. The exemplary system 3700 includes a WiFi network 3710, a cellular network 3720 a system server 3730, a PDA 3740, a data interface unit 3750, and a vehicle or truck 3760. The WiFi Network 3710 is connected to the PDA 3740 via a WiFi Adapter 3770. The PDA 3740 is connected to the data interface unit 3750 via a wireless Bluetooth link 3780. The cellular network 3720 is connected to the PDA via a cellular modem 3722; the cellular network 3720 is also connected to the data interface unit 3750 via a second optional cellular modem 3724. The data interface unit 3750 interfaces with multiple physical sensor connections 3790 positioned on the truck 3760.

Similar to previously described embodiments of the present invention, in terms of functionality, an alternative embodiment of the Truck Monitoring System or Trucktrax automatically calculates truck operation statuses; displays navigation maps, supports paperless tickets, and provides two-way text messaging. According to aspects of this embodiment, however, Personal Digital Assistant (PDA) technology is integrated into the system to yield a smaller overall system. This "PDA" embodiment of the system is able to perform the above functions with a main unit that can fit in the palm of one's hand.

The PDA embodiment is composed of two subsystems: the PDA and the base data interface unit. Using the standard wireless technology, for example, Bluetooth, the two subsystems are untethered from each other, giving greater flexibility in the mounting of the PDA. For example, the PDA can be mounted in various convenient positions on the dashboard or on a console, depending on the configuration of the vehicle and the desire of the user, while the data interface unit is out of sight, behind the driver seat for example. FIG. 37 illustrates the embodiment of the system that incorporates a PDA in the system.

Personal Digital Assistant:

According to aspects of this alternative embodiment, a personal digital assistant (PDA) is provided in lieu of the on-board computer. Accordingly, the PDA is the brain behind this embodiment system' functionalities, as well as the information display unit for the end user. Running a custom software package, the PDA is capable of automated truck operation status calculations, navigation map presentation, paperless tickets, and two-way text messaging. Using either a cellular modem card or a WiFi (802.11b) network adapter (discussed above), the PDA transmits data to the server. In order to maintain the integrity of the data, if communication to the server is not available, the data are buffered and resent when communication is reestablished. In some circumstances, the data may be recorded and downloaded at a later time either via a modem card, WiFi (80211b), cellular modem, data phone, data port or other acceptable means.

Data Interface Unit

Using an array of digital and analog inputs, the data interface unit is connected to various on-board sensors, and the data is broadcasted wirelessly to the PDA via a Bluetooth link. In accordance with aspects of the present embodiment, three analog inputs, eight digital inputs, and one digital output are available on the data interface unit. Standard on-board sensors include a sensor for receiving information related to the GPS receiver, drum rotation speed and direction, water flow to drum, admixture flow to drum and wash water indicator. The remaining two digital and three analog inputs can be used with additional sensors. In yet another alternative embodiment, for example, when real-time analysis of the truck data is not required, the data interface unit can be installed as a stand-alone unit. In this situation, a cellular modem (or data phone) can be connected directly to the data interface unit and used for data transmission to the server.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other truck tracking systems, not necessarily the exemplary data collection format described above.

The various embodiments described above can be combined to provide further embodiments. Aspects of the invention can be modified, if necessary, to employ the systems, circuits and concepts of the various patents and applications described above to provide yet further embodiments of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A resource management system for detecting the location and status of a plurality of trucks, comprising:

a plurality of trucks;

a plurality of sensors mounted to each of the trucks wherein the sensors measure selected truck functions;

a processor on-board each truck, the processor further including a display and an input, wherein the sensors are operably connected to the processor and wherein the processor receives information from the sensors, the processor further receives information from a central server, the processor calculates the information from the sensors and from the central server to provide truck statuses and an electronic ticket; and means for generating an exceptions report in real-time, the server receiving information from the on-board processor to prepare an exceptions report based on each truck location and status information.

2. The resource management system of claim 1 wherein the sensors provide information about: the truck location using a GPS receiver; vehicle operating data; truck status; drum rotation speed and direction; water flow to the drum; admixture flow to the drum; wash water flow; hydraulic hose line pressure; engine diagnostic information; engine ignition on/off information; fuel efficiency or driver safety data.

3. The resource management system of claim 1 wherein the processor is a personal computer.

4. The resource management system of claim 1 wherein the processor is a personal digital assistant.

5. The resource management system of claim 1 wherein the display is a touch screen.

6. The resource management system of claim 1 wherein the input is a keyboard.

7. The resource management system of claim 1 wherein the exceptions report includes at least one of the following exceptions: loaded status at a mechanics shop; driver on over-time; driver on double-time; driver eligible for lunch; truck stopped for greater than ("x") minutes while in return status; "On Job" status greater than 15 minutes without transitioning to "Pour Status;" and/or a message from the driver.

8. The resource management system of claim 1 wherein the exception report is customized in an editable script file that executes on the data server.

9. The resource management system of claim 1 wherein the processor includes a customizable truck status calculation script.

10. The resource management system of claim 1 wherein the server includes a graphical display of pending orders by at least one of the following: batch plant; truck status; customer; job size; or job location.

11. A method of tracking a plurality of trucks using a wireless communication system, comprising:

determining the location of each of the trucks using a Global Positioning System receiver;

determining the status of each of the trucks by polling sensors provided on-board each truck;

transmitting the location and status information via a wireless communication system;

generating an electronic ticket containing relevant order information incorporating data transmitted via the wireless communication system as well as at least some of the information from the sensors; and preparing an exceptions report on an exceptions server.

12. The method of tracking a plurality of trucks of claim 11 wherein the location includes: at a batch plant; loading at the batch plant; traveling to the job site; at the job site; start pour; end pour; wash out; or leave job site.

13. The method of tracking a plurality of trucks of claim 11 wherein the sensors include providing information about at least one of the following: vehicle operating data; truck status; drum rotation speed and direction; water flow to the drum; admixture flow to the drum; wash water flow; hydraulic hose line pressure; engine diagnostic information; engine ignition on/off information; fuel efficiency or driver safety data.

14. The method of tracking a plurality of trucks of claim 11 wherein determining the location and determining the status includes collecting data at a frequency of at least every 60 seconds or less.

15. The method of tracking a plurality of trucks of claim 11 further including providing finishing sub-contractor with a billing service.

16. The method of tracking a plurality of trucks of claim 11 further including modifying the status calculation script remotely, thereby changing the status determination for selected trucks.

17. The method of tracking a plurality of trucks of claim 11 further including displaying graphically at a separate server location at least one of a status or location determination for the plurality of trucks.

18. The method of tracking a plurality of trucks of claim 11 further including managing the plurality of trucks from a remote server based on information transmitted wirelessly from the sensors of the trucks.

19. The method of tracking a plurality of trucks of claim 18 wherein the managing of the plurality of trucks includes redirecting trucks enroute based on resource allocation management.

20. The method of tracking a plurality of trucks of claim 18 wherein the managing of the plurality of trucks further includes a data collection frequency of every 60 seconds or less.

21. The method of tracking a plurality of trucks of claim 18 wherein the managing of the plurality of trucks further includes a data collection frequency of up to once per second.

22. The method of tracking a plurality of trucks of claim 18 wherein the managing of the plurality of trucks further includes a graphical display of at least one of the truck's progress in a crumb-trail format.

23. The method of tracking a plurality of trucks of claim 18 wherein the managing of the plurality of trucks further includes providing data reports based on the information retrieved.

24. The method of tracking a plurality of trucks of claim 18 wherein the managing of the plurality of trucks further includes modifying at least one of the truck's status or route in real-time.

25. The resource management system of claim 1 wherein the display is configured to display a signature box.

26. The resource management system of claim 1 wherein the exceptions report is based on one more driver based parameters.

27. A method of tracking a plurality of trucks using a wireless communication system, comprising:

determining locations of each of the trucks;

determining an operating status of each of the trucks by polling one or more sensors provided on-board each truck;

transmitting a location information and a status information via a wireless communication system; and preparing an exceptions report based on one or more transmissions via the wireless communication system, wherein the exceptions report comprises:

a loaded status at a mechanics shop;

a driver on over-time;

driver on double-time;

a driver eligible for lunch;

truck stopped for greater than ("x") minutes while in return status;

"On Job" status greater than 15 minutes without transitioning to "Pour Status;"

a message from the driver.

* * * * *